Jan. 25, 1966 P. V. VASILE 3,231,718
AUTOMATIC ELECTRIC FOOD WARMER TRAY
Filed Feb. 5, 1962 7 Sheets-Sheet 1
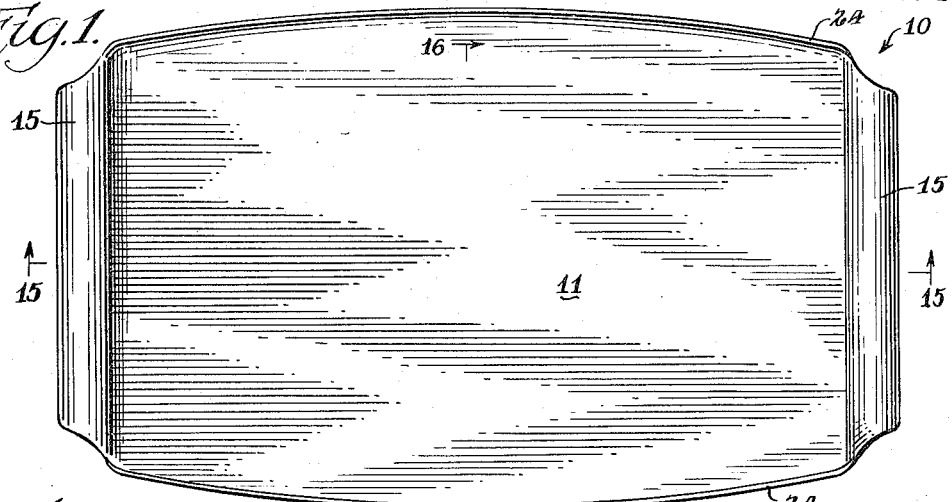
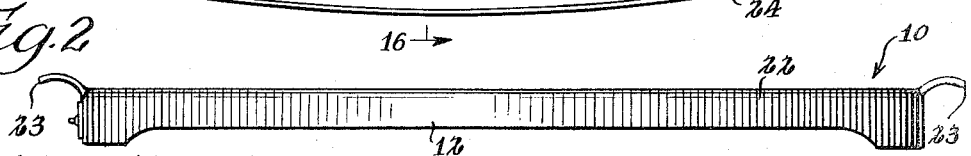
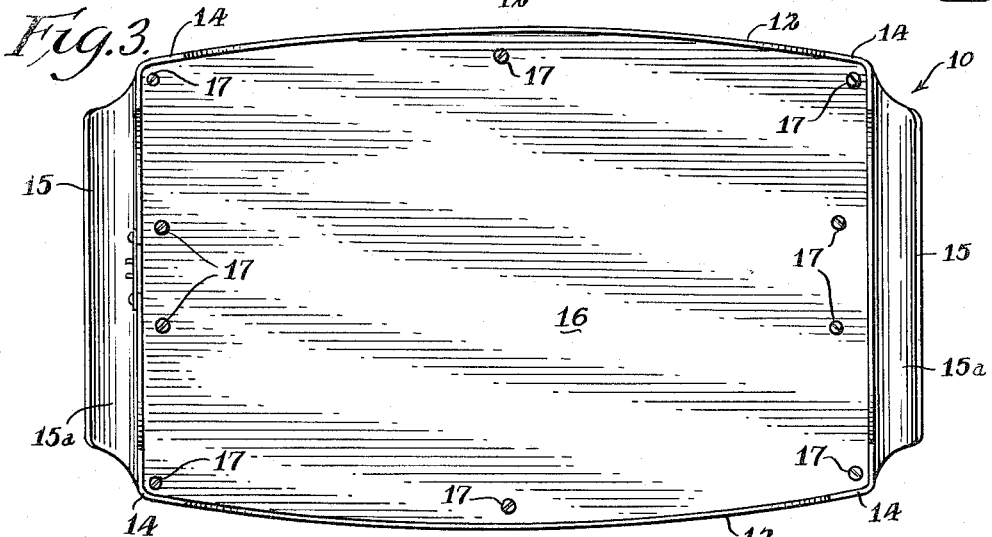
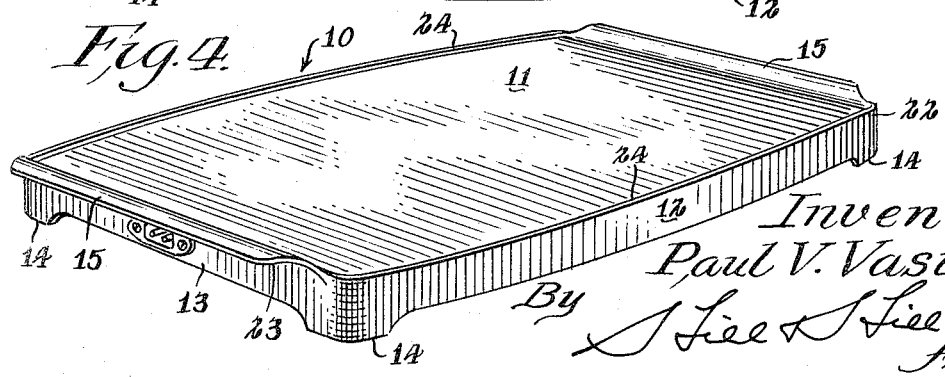
Inventor
Paul V. Vasile
By
Hill & Hill
Attys.

Inventor
Paul V. Vasile

Inventor
Paul V. Vasile

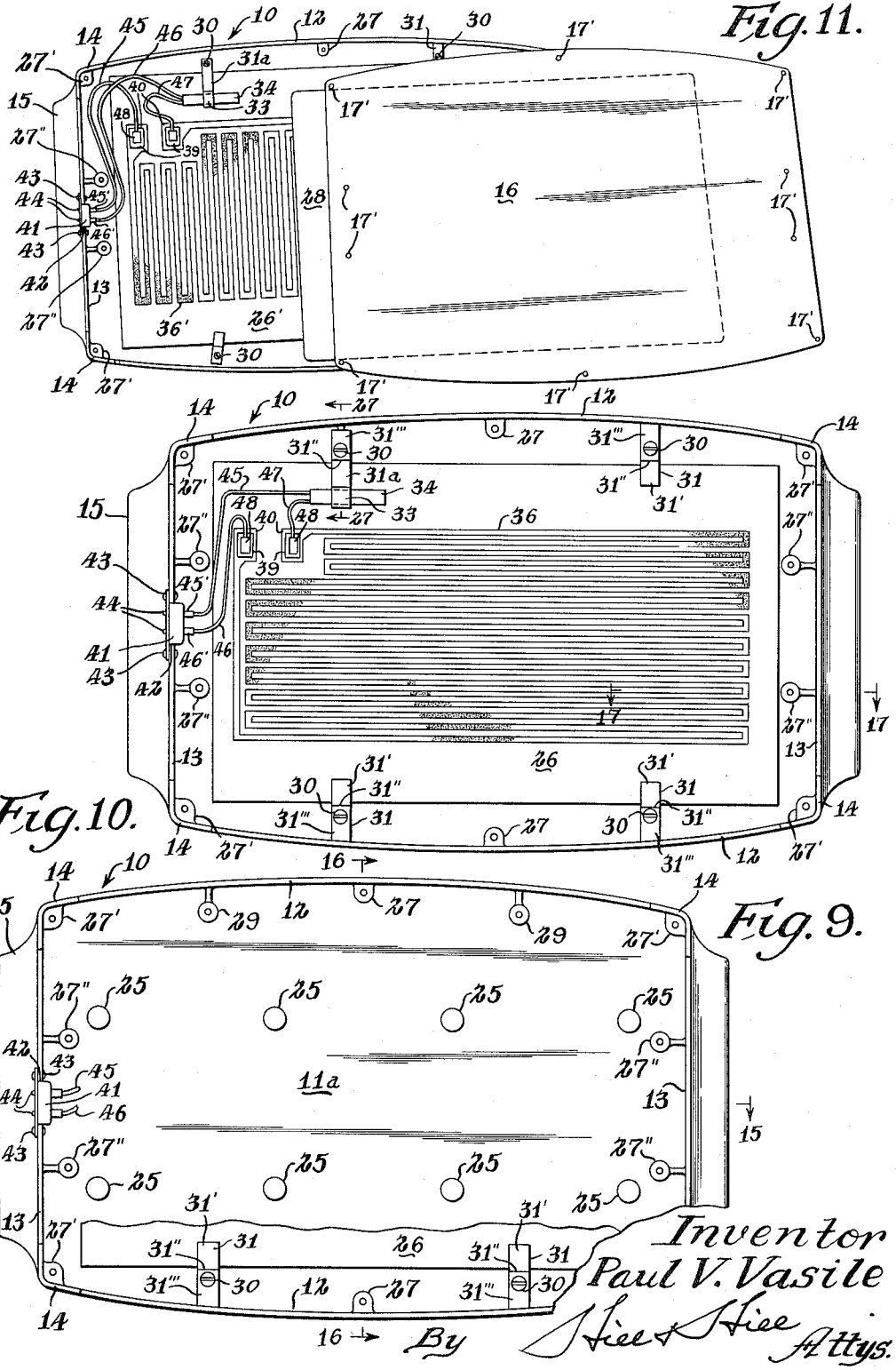

Inventor
Paul V. Vasile

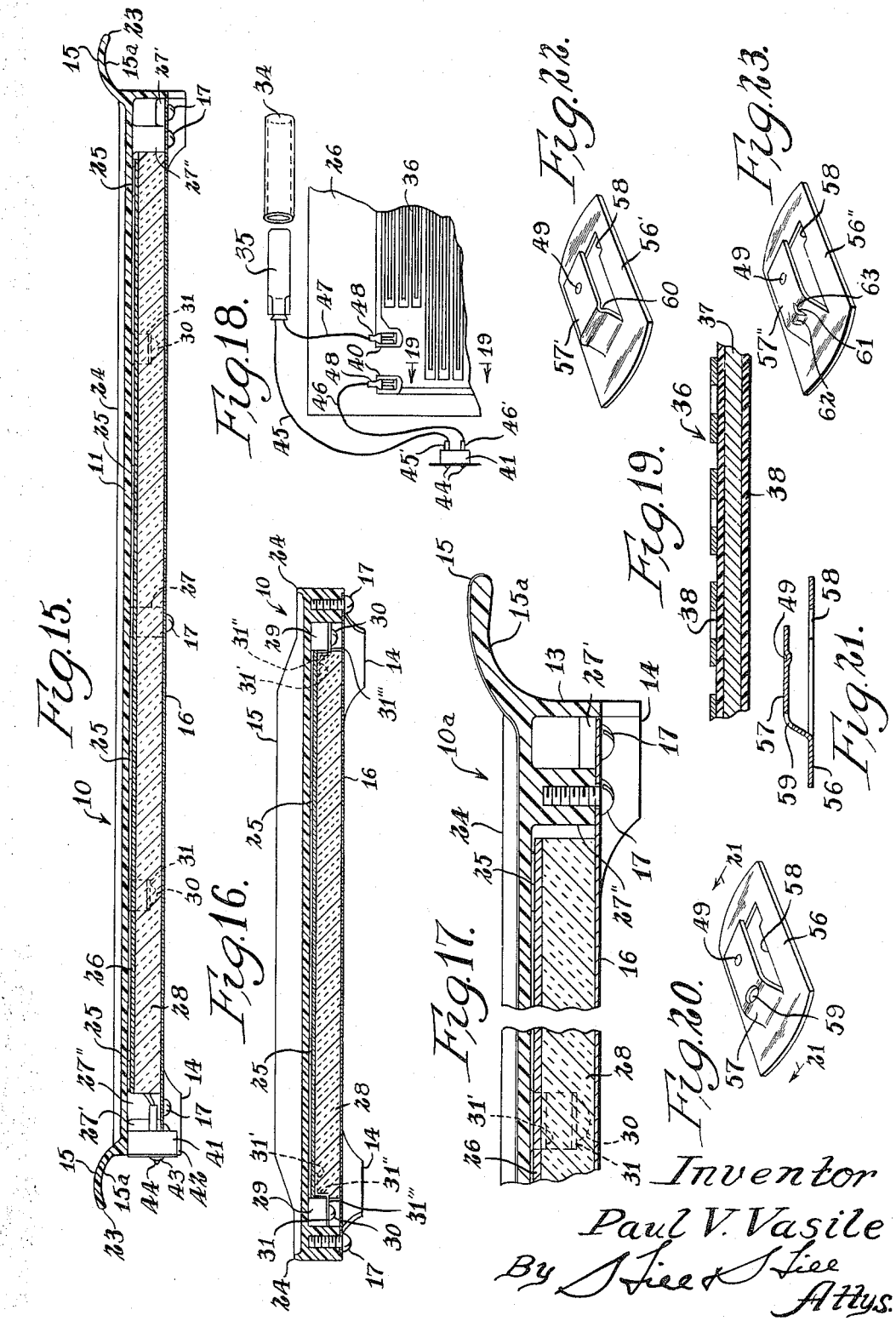

Jan. 25, 1966 P. V. VASILE 3,231,718
AUTOMATIC ELECTRIC FOOD WARMER TRAY
Filed Feb. 5, 1962 7 Sheets-Sheet 7
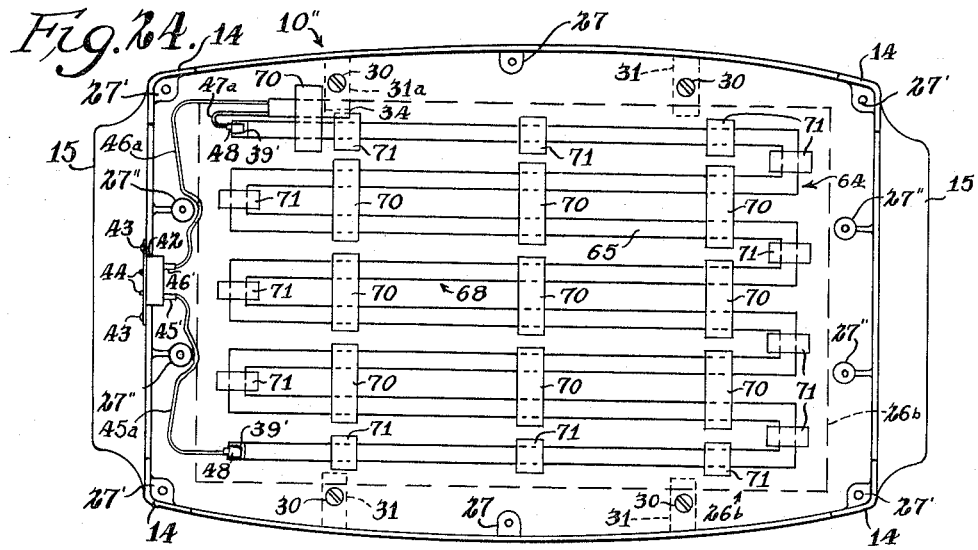
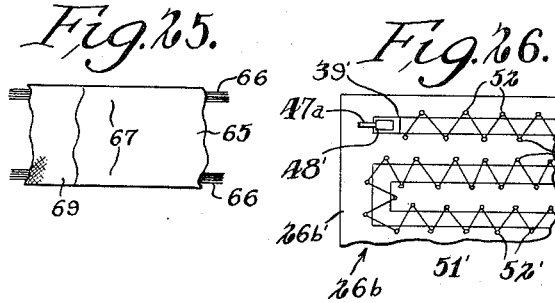
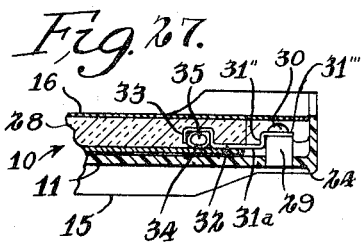
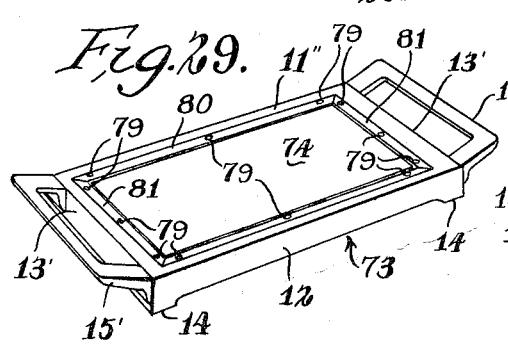
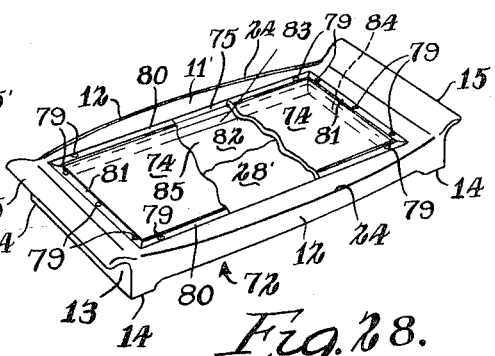
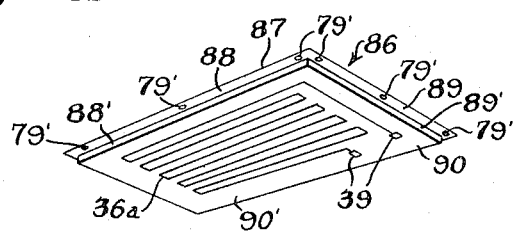
Inventor
Paul V. Vasile
By Stiel & Stiel
Attys 3,231,718
AUTOMATIC ELECTRIC FOOD WARMER TRAY
Paul V. Vasile, Chicago, Ill., assignor to Akay Corporation, Chicago, Ill., a corporation of Illinois
Filed Feb. 5, 1962, Ser. No. 171,154
32 Claims. (Cl. 219—465)

This invention relates to automatic electric food warmers, and more particularly to an automatic electric food warmer tray having an ornamental surface including that of the heating surface and/or handles in which the ornamental surface is integrally molded during the molding of the tray.

Prior to my invention warmer plates have been used including a conductive alloy fused to glass as a means for heating. Although this conductive alloy fused to glass as a means for heating is entirely satisfactory, there are limitations to decorative patterns which may be used and also there are certain limitations with respect to new shapes and contours which are imposed by the use of metal and glass.

It is therefore a principal object of my invention to provide an improved automatic electric food warmer tray, wherein it is possible to give the surface of the tray all the decorative patterns one may select in substantially the same manner as dinner ware is molded and decorated utilizing ornamental lithographed foil fused into the surface of the tray as it is molded.

Another object of the invention is to provide a one-piece molded food warmer tray with handles, surface, sides and bottom feet forming continuous surfaces, certain ones of which may be suitably ornamented and also formed in contrasting colors.

Another object of the invention is to provide a food warmer tray utilizing a melamine material for the tray and also for the surface for keeping food warm thereon.

Still another object of the invention is to provide warmer trays in various shapes and sizes formed from thermo-plastic and/or thermo-setting plastic material.

Still another object of the invention is to provide food warmer trays in various decorative patterns by decorating the molded plastic tray by means of lithographed paper foil impregnated with a thermo-setting plastic and fused into the surface of the molded tray.

Another object of the invention is to provide an automatic electric food warmer tray of molded plastic and to impart a relatively mild and uniform heat on the under surface of the warmer tray which avoids hot spots and consequent charring of the plastic material of which the warmer tray is molded.

Still another object of the invention is to provide a heating element for the food warmer tray of woven fibrous glass tape in any predetermined width from one-half inch including electrical conductors in the selvage edges into which a coductive silicone rubber has been vulcanized under pressure to avoid hot spots and consequent charring of the plastic.

A further object of the invention is to provide an improved radiant heating element which is self-supporting, has inherent rigidity that is of rugged construction and not easily subject to damage by mechanical or heat shock to impart a relatively mild and uniform heat on the under surface of the warmer tray to prevent hot spots and consequent charring of the plastic.

Still another object of the invention is to provide a heating element insulated with triple unimpregnated fiber glass braid and wound on an asbestos core and supported upon a foil-like aluminum sheet to provide means for providing a relatively mild and uniform heat on the under surface and which avoids hot spots and consequent charring of the plastic material forming the warmer tray.

Another object of the invention is to provide an automatic electric food warmer tray for connecting to a variable alternating current source which will withstand the conventional dielectric strength test without dielectric failure.

Still another object of the invention is to provide an automatic electric food warmer tray which will withstand conventional normal dry temperature tests and also a similar test when repeated with a pan of water on the surface of the automatic electric food warmer tray, and likewise to also withstand abnormal temperature tests.

Still another object of the invention is to provide an automatic electric food warmer tray which will withstand conventional insulation resistant tests, moisture abuse and mechanical abuse tests, as well as other conventional dielectric strength tests so that there is no evidence of dielectric breakdown of the insulation.

Another object of the invention is to provide an ornamented heating surface which avoids hot spots and consequent charring of the plastic bzy utilizing a foil-like lithographed sheet of paper impregnated with a melamine plastic and fused to the surface of the heating tray and/or further ornamented with preselected lithographs in a special heat resistant ink.

Still another another object of the invention is to provide an improved food warmer tray from thermo-setting plastic material from the group consisting of melamine and phenolic by compression molding at a temperature of substantially 300° F. under 350 tons pressure, and after the piece has been partially cured and the mold opened for the insertion of an ornamental lithographed foil sheet of paper impregnated with melamine laid on the top of the partially cured piece and the mold closed for final curing to provide a completed molded warmer tray within a cycle of substantially three minutes.

Still another object of the invention is to provide an automatic electric food warmer tray with the input wattage varying within the range of from substantially 90 watts to substantially 200 watts to impart a relatively mild and uniform heat on the under surface of the food warmer tray and avoiding hot spots and consequent charring of the plastic to provide a surface temperature of the warming tray within the temperature range of from substantially 158° F. to 176° F. with an ambient temperature of substantially 77° F.

According to the invention, the following features are incorporated to provide an automatic electric food warmer tray which preferably comprises a tray enclosure with or without handles and integrally molded under a predetermined temperature and pressure in a predetermined cycle from a thermo-setting material of the group preferably consisting of melamine molding compound or melamine molding compound and a phenolic substance having a minimum thickness throughout and having integrally formed feet for supporting the tray above a supporting surface and having overall dimensions including handles of substantially 1¼" x 12⅜" x 20½", and having mounted therein a heating element plate of sheet aluminum preferably coated on both sides with porcelain enamel and on one side having a heating element in a gridlike pattern and adapted for affixing to the underneath surface of the warmer tray. A suitable receptacle for receiving a cord set, preferably detachable, and the receptacle connected with internal wiring to a thermostat suitably affixed to the enclosure and to the underneath surface of the heating element plate in heat transfer relation with respect to the grid-like pattern of the heating element, and insulation provided between the bottom of the heating element plate and a bottom plate of sheet aluminum affixed to the enclosure of the warmer tray. In another embodiment of the invention, the features of the improved warmer tray are similar to that previously described with the exception that the heating element is insulated with triple unimpregnated fiberglass braid and wound on an asbestos core, and the heating element being supported on an aluminum foil-like sheet of from substantially 0.003 to 0.005" in thickness, having an overall area of 10" x 16" and being similar in area to that of the porcelain coated sheet aluminum element plate, and being positioned by metal clamps and secured in place by insulation and having the heating element wires stitched in place by a heat resistant string. In another embodiment of the improved warmer tray, the heating element may be in the form of woven fibrous glass tape containing electrical conductors in the salvage edges into which a conductive silicone rubber has been vulcanized under pressure and the tape affixed to the under surface of the warmer tray by a suitable fiber glass tape with a thermosetting adhesive running perpendicular to the heating tape, and further support being given by a blanket of insulating fiberglass resting against the heating tape and the inside surface of the bottom cover. In the various embodiments of the warmer tray of this invention, the warmer tray may be molded from a thermo-setting material such as melamine molding powder and if desired to have greater heat resistance to avoid hot spots and consequent charring of the plastic, the warmer tray may be suitably molded with a composition including melamine molding material and a phenolic substance, and if it is desired to have the heating surface of the warmer tray and/or the heating surface and the integrally molded handles suitably ornamented, this may be accomplished by fusing a foil-like lithographed paper sheet preferably impregnated with melamine plastic fused to the heating surface of the warmer tray during the molding cycle, wherein ornamental surfaces such as different wood grains may be simulated and other floral and ornamentive surfaces applied in the same manner.

Many other objects and advantages of the method of molding the enclosure providing the supporting and heating surface of the automatic electric food warmer tray and the resultant plain or ornamented enclosure herein shown and described will be obvious to those skilled in the art from the disclosure herein given.

To this end my invention consists in the novel construction, arrangement and combination of parts herein shown and described and more particularly pointed out in the appended claims.

In the drawings wherein like reference characters indicate like or corresponding parts:

FIG. 1 is a plan view of an unornamented automatic electric food warmer tray of my invention;

FIG. 2 is a front elevational view thereof;

FIG. 3 is a bottom view thereof;

FIG. 4 is a perspective view thereof;

FIG. 9 is a bottom view of the tray illustrating the supporting pads for the heating element and the integrally molded supports for detachably mounting the bottom plate and also the integrally molded supports for the clamping means for the heating element plate;

FIG. 10 is a bottom view of the warmer tray illustrating the heating element plate and the grid-like pattern of the heating element, together with the cord receptacle and internal wiring including the thermostat assembled in position;

FIG. 11 is an exploded view of the automatic electric food warmer tray illustrating the heating element plate receptacle, internal wiring and thermostat assembled in place and the insulation and bottom plate detached;

FIG. 15 is a longitudinal sectional view taken along line 15—15 of FIG. 1 and FIG. 9, illustrating the assembly of the bottom plate, the insulation, the heating element plate to the warmer tray;

FIG. 16 is a vertical cross-sectional view taken along line 16—16 of FIG. 1 and FIG. 9 looking in the direction of the arrows and illustrating the assembly of the bottom plate, the insulation and the heating element mounted within the warmer tray;

FIG. 17 is an enlarged view partly in cross-section, taken along line 17—17 of FIG. 10 and illustrating the securing means at a corner of the warmer tray for affixing the bottom plate and heating element plate to the warmer tray;

FIG. 18 is an enlarged corner portion of the heating element plate illustrating an enlarged portion of the detachable connecting means at the terminals of the electrical heating grid and the internal wiring connected to the receptacle and to the thermostat with the fiberglass sleeve of the thermostat detached;

FIG. 19 is an enlarged sectional view taken along line 19—19 of FIG. 18, looking in the direction of the arrows, illustrating the construction of the heating element plate;

FIG. 20 is a perspective view of an improved male connector for the terminals of the grid circuit of the heating element plate;

FIG. 21 is a vertical sectional view taken along line 21—21, looking in the direction of the arrow, of the connector of FIG. 20;

FIG. 22 is a perspective view of a male connector modified from that of FIG. 20 and FIG. 21;

FIG. 23 is a perspective view of still another modified male connector from that of FIG. 20 and FIG. 22;

FIG. 24 illustrates the bottom of the warmer tray with the bottom plate detached and illustrating a modified form of heating element affixed to the underside of the heating surface of the warmer tray;

FIG. 25 is an enlarged plan view of a heating element consisting of woven fiberglass tape containing electrical conductors in the selvage edges into which a conductive silicone rubber has been vulcanized under pressure;

FIG. 26 is an enlarged corner section of a heating element including a woven fibrous glass tape stitched to a foil-like aluminum sheet to provide an electric grid as illustrated in connection with the heating element plate of FIG. 12, FIG. 13 and FIG. 14, and illustrating a male connector electrically connected to a terminal end of the flexible heating plate;

FIG. 27 is an enlarged vertical sectional view taken substantially along line 27—27 of FIG. 10 and looking in the direction of the arrows of the clamp for affixing the insulated thermostat to the heating element plate;

FIG. 28 is a perspective view, partly in cross-section, illustrating a modified form of automatic electric warmer tray in which the heating element plate is a warmer surface and the warmer tray is integrally molded for mounting the insulation in a recess having an integrally molded bottom plate;

Figure 5:
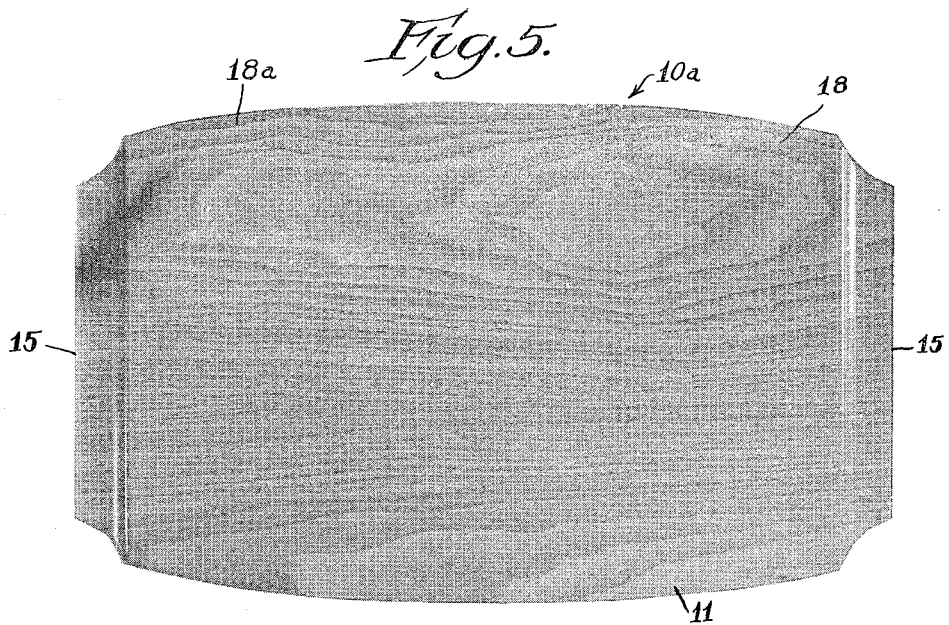
FIG. 5 is a plan view of the automatic electric food warmer tray of my invention showing the heating surface and handles ornamented with a "Driftwood" pattern.

FIG. 29 is a perspective view of an automatic electric warmer tray in which the shape of the warmer tray is different from that of FIG. 28 and the molded warmer tray is adapted for mounting detachable handles; and FIG. 30 is a perspective view of the underneath surface of a stainless steel griddle schematically illustrating an electric grid circuit on a porcelainized surface of the griddle, the griddle being adapted to be substituted for the electric heating element of FIG. 28 and FIG. 29 to provide a cooking surface instead of a warmer surface.

Referring to FIG. 1, FIG. 2, FIG. 3 and FIG. 4, there is illustrated an automatic electric warmer tray 10 which has a heating surface 11 which has a surface temperature thermostatically controlled within the range of temperature of from substantially 150° F. to 180° F. for maintaining the temperature of foods and liquids within the temperature range desired depending upon the input wattage to the heating element and the preset or variable setting of a suitable thermostat. It is also within the scope of the invention that a variable thermostat control varying within the range of 150° F. to 425° F. may be used if instead of using the tray as a warmer tray it is desired to use the surface of the tray for a cooking surface. A particular form of cooking surface will be described later although it is to be understood it is within the scope of the invention that standard commercial variable thermostats (not shown) having the graduations off, low, medium and high may also be used wherein it would be preferable to maintain the food or liquid kept warm within a temperature range of from substantially 150° F. to 180° F. as an example, and which obviously would be below the boiling temperature of water. When a griddle is used with this invention, a variable thermostat having a maximum range of substantially 425° F. may be used in order to maintain the surface temperature of the griddle at the preferred temperature for the food being cooked upon a griddle surface.

The heating surface 11 including the peripheral depending longitudinal sides 12 and ends 13 has a minimum thickness of substantially 1/8" and is molded with integral feet 14 to support the warmer tray substantially 7/16" above a supporting surface. Handles 15 are also integrally molded to the ends of the warmer tray and the ends of the heating surface 11 and may be considered as being integrally formed at the ends of an axis of a heating surface. Although it is preferred to make the warmer tray in the shape as illustrated in FIG. 1 through FIG. 4 having an overall dimension of 1¼" x 12⅜" x 20½" including the handles 15, it is to be understood that any suitable geometrical shape such as rectangular, circular and others which may be suitably integrally molded may be used and not only molded in predetermined shapes but also in predetermined sizes within the limits of the molding material and the die and molding machine which may be used. It is preferred to use a thermo-setting plastic material, one being "Cymel" molding compound as manufactured by American Cyanamide which is a melamine plastic material by compression molding under heat within the range of substantially 300° F. in a molding machine of 350 tons pressure in a predetermined cycle wherein the cycle is within the period of time of substantially three minutes depending upon the predetermined cycle set for the machine.

In order that a heating surface of the integrally molded warmer tray may have a greater resistance to heat in order to prevent hot spots and consequent charring, it is preferable to use a thermo-setting plastic material having a composition of the group consisting of a melamine material and a phenolic substance such as manufactured by a Plastic Engineer Company of Sheboygan, Wisconsin although it has been found that a thermo-setting plastic material of melamine may be satisfactory.

A bottom plate 16 in the form of sheet aluminum No. 18 M.S.G., substantially 12 1/16" wide x 18" in length and shaped as illustrated in FIG. 3 is secured by ten screws 17 as shown in FIG. 3. It is preferred that the screws 17 shall be self tapping as will be described later with reference to FIG. 9. It is also within the scope of the invention that a bottom plate may be formed of enamel coated steel No. 22 M.S.G., fabricated to the same size and prepunched as is the aluminum bottom plate for the reception of the self tapping screws for affixing the bottom plate to the enclosure of the warmer tray provided by the longitudinally extending sides 12 and ends 13. If aluminum sheeting is used it is preferred to have it anodized in order to provide a suitably ornamented bottom plate and which also serves to reflect any heat from the heating element toward the under surface of the heating surface 11. If desired, for further ornamentation steel bottom plate or the aluminum bottom plate may have a suitably ornamented surface either by rolling or stamping.

Figure 6:
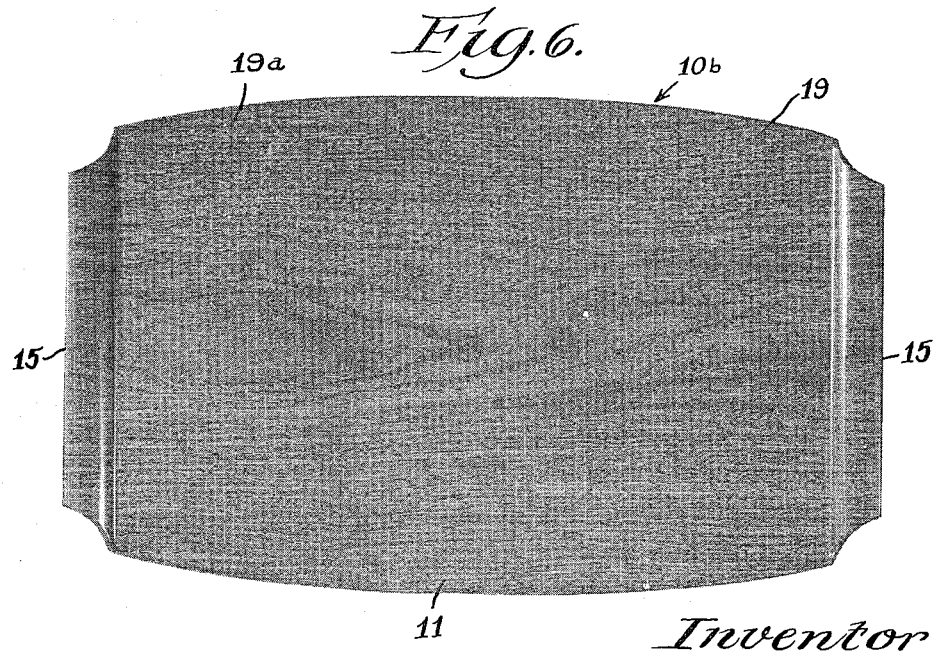
FIG. 6 is a plan view of the automatic electric food warmer tray with a heating surface and handles ornamented with a walnut grain pattern.
Figure 8:
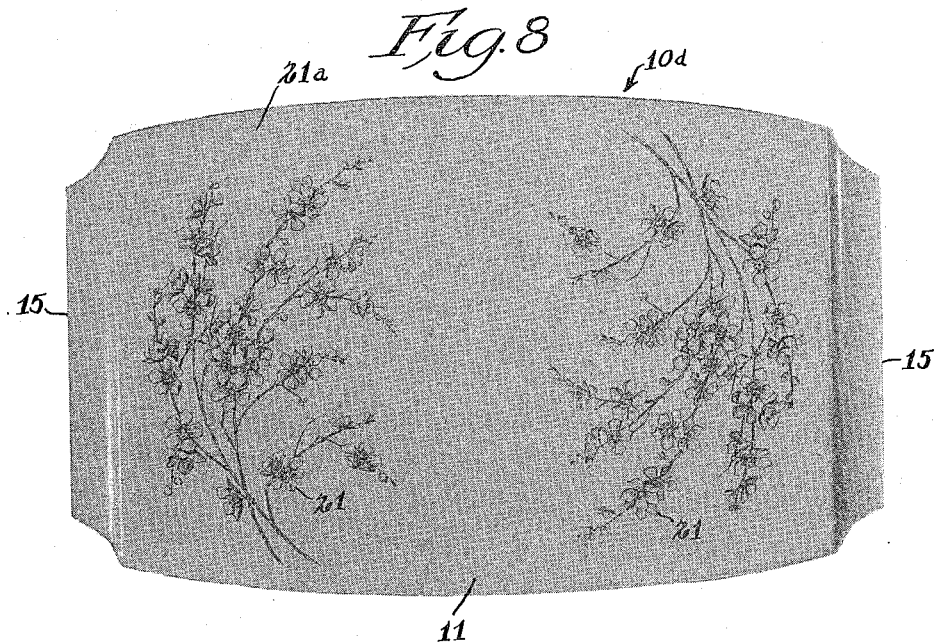
FIG. 8 is a plan view of the automatic electric food warmer tray with the heating surface and handles ornamented in a color contrast to that of the other surfaces of the tray and with the heating surface ornamented with an "Apple Blossom" pattern.
Figure 7:
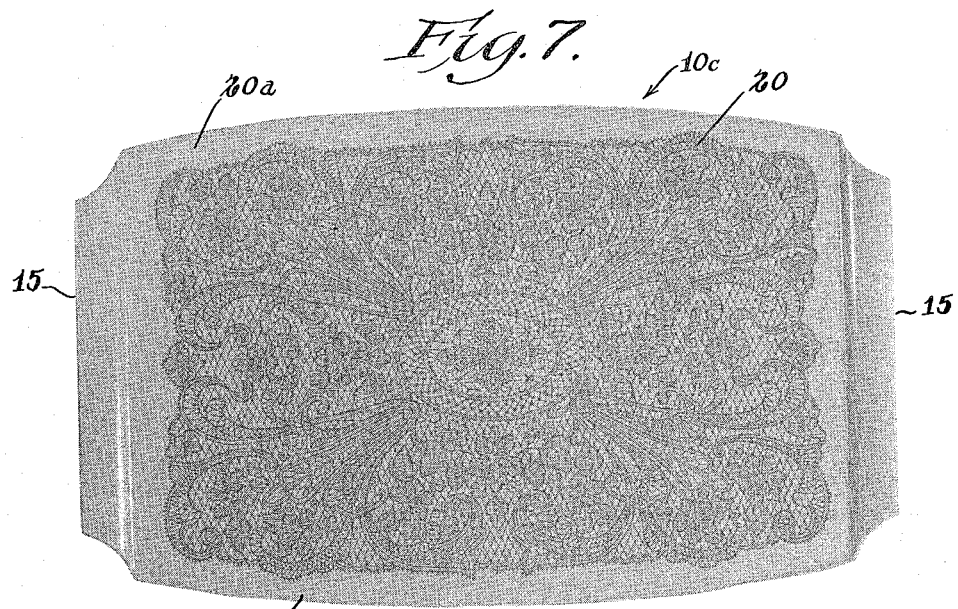
FIG. 7 is a plan view of the automatic electric food warmer tray with a heating surface and handles having a color in contrast to that of the other surfaces of the tray and with the heating surface ornamented with an "Irish Lace" pattern.

Referring to FIG. 5, FIG. 6, FIG. 7 and FIG. 8 there are illustrated several ornamental designs for the heating tray surface and handles as shown in FIG. 5 and FIG. 6, and in FIG. 7 and FIG. 8 there are illustrated ornamental designs for the heating surface only although the face of the tray and he handles of both FIG. 7 and FIG. 8 are in contrast to the color of the molded tray and are the color of the surface and handles of the ornamental design of FIG. 5 and FIG. 6. Referring to FIG. 5, the molded warmer tray 10a has a "Driftwood" pattern 18 integrally molded to the heating surface and upper surfaces of the handles 15. In the embodiment of FIG. 6, the molded tray 10b has a walnut surface 19 integrally molded to the heating surface 11 and to the upper surfaces of the handles 15.

In the embodiment of FIG. 7, the molded tray 10c has an "Irish Lace" pattern 20 integrally molded to the heating surface 11. However, in this embodiment the foil-like lithograph 20a which has lithographed thereon the "Irish Lace" pattern is integrally molded to the surface 11 of the heating tray as well as to the upper surfaces of the handles 15. In FIG. 8, the molded tray 10d has an "Apple Blossom" pattern 21 symmetrically arranged as shown and integrally molded to the heating surface 11. As in the embodiment of FIG. 7, the foil-like lithograph 21a which has the lithographed "Apple Blossom" design thereon is integrally molded to the heating surface 11 of the tray and also to the upper face of the handles 15.

The foils 18a of FIG. 5, 19a of FIG. 6, 20a of FIG. 7 and 21a of FIG. 8 having respectively "Driftwood," "Walnut," "Irish Lace" and "Apple Blossom" patterns as illustrated are lithographed with a special heat resistant ink on suitable paper within the range of from 0.007" to 0.008" in thickness and the paper of the foil is impregnated with melamine plastic. A "Driftwood" foil is lithographed on the same type of paper as are the others and is gray-like in appearance because in the molded tray of FIG. 5, the lithographed foil is integrally molded on a molded tray molded from a melamine phenolic plastic powder gray in color. The foil is so thin that the gray color of the tray strikes through the lithograph further enhancing the appearance of the tray.

Similarly in FIG. 6, the foil 19a lithographed in a "Walnut" design and color was lithographed on a molded tray molded from beige malamine phenolic molding powder. Also in the molding, the lighter parts of the foil are colored by the beige color of the integrally molded tray. Referring to FIG. 7, the "Irish Lace" pattern 20 is brown in color on the relatively white surface of the foil but also in this embodiment the molded tray is formed from beige melamine phenolic molding powder so that in the molding operation the beige color strikes through the substantially white foil color further ornamenting the upper surface of the tray.

Also in the embodiment of FIG. 8, the "Apple Blossom" pattern 21 is lithographed in blue upon the foil 21a which is substantially white in color. As in the embodiments of FIG. 6 and FIG. 7 the molded tray of FIG. 8 is made from beige melamine phenolic molding powder and the beige color of the molded tray similarly strikes through the white lithograph foil further enhancing the ornamental appearance of the tray.

Although the molding powder of the plastic for the molded tray of FIG. 5 is gray and the molding powder from which the trays of FIG. 6, FIG. 7 and FIG. 8 are molded in beige color, it is to be understood that molded trays of this invention may be made from any colored plastic, for example, as white which is the color of the tray of FIG. 1 from which the drawing was made on blue. For example, the "Apple Blossom" pattern 21 has been formed on a blue colored tray which is also very effective. Obviously, also other ornamental designs other than those described with reference to FIG. 5, FIG. 6, FIG. 7 and FIG. 8 may be utilized without departing from the scope of the invention, the designs being those that a lithographer may produce which are suitable for lithographing on a melamine impregnated foil sheet and which may be suitably integrally molded in a molding operation using thermo-setting plastics, either of melamine and preferably a melamine phenolic plastic to provide a molded tray and surface which avoids hot spots and consequent charring of the plastic when used as a warming tray.

The foils dividing the lithographed surfaces of the tray are complementally formed to the dimensions of the heating surface and the upper surfaces of the handle and to conform to the inner molding surface of the mold from which the trays are formed so that the width of the foil extends slightly down to the parting edge of the mold which may be indicated relatively at 22 and 23 in FIG. 4 as the foil extends over the raised edges 24 of the heating surface 11 and over the upper surfaces of the handles 15 respectively to the parting edges 22 of the heating surface 11 and the parting edge 23 of the handles 15. With this ornamental design, the upper surface of the heating surface and that of the handle is ornamented as described either with the entire heating surface and handles ornamented or only with the heating surface ornamented as shown in FIG. 7 and FIG. 8, and the remainder of the surfaces of the tray has the sides 12, the ends 13, the legs 14 and the underneath surfaces 15a as well as the underneath surface 11a and the integrally formed and molded supports to be described later with reference to FIG. 9 are the color of the thermo-setting plastic molding powder as used to form the particular molded and ornamented tray desired.

In molding the warmer trays of FIG. 5, FIG. 6, FIG. 7, and FIG. 8 with the lithographed surfaces as described and also any others within the scope of the invention, the warmer tray preferably formed from melamine phenolic powder is first formed by compression molding at a temperature of substantially 300° F. with a 350 ton press. The tray is partially cured during the molding operation for one and one-half minutes after which the mold opens for a short time. In this short period, the melamine saturated absorbent paper with the lithographed design of special heat resistant ink is placed on top of the pre-cured molded tray to cover the heating surface 11 and the upper surfaces of the handles 15. As previously described, the dimensions of the foil are such that the foil extends slightly over the longitudinal edges of the heating tray and also slightly over the edges of the handle to the respective parting edges of the upper face of the tray, previously identified as 24 and 23, respectively, FIG. 2 and FIG. 4. The mold is then closed for the final cure of one minute, and when the molded tray is completely cured the mold is withdrawn having the upper surfaces per minute as described with a preselected design which may be wood grain, floral, lace or other suitable design and in which the molded tray portions other than the surfaces having the foil integrally molded thereon are in contrasting colors depending upon the color of the molding powder for molding the warmer tray. The cycle of operation of molding and integrally laminating the melamine impregnated paper lithographed foil to the upper faces of the warmer tray is within a period of substantially three minutes. It is necessary, however, to have the lithographed foil completely laminated to the surfaces of the tray that the absorbent paper on which the lithograph design is formed shall be completely saturated with melamine in order to laminate with the melamine and/or melamine phenolic from which the warmer tray is first molded prior to the lamination of the foil to the molded tray within the final stage of the molding cycle.

Referring to FIG. 9, FIG. 10, FIG. 11, FIG. 15, FIG. 16, FIG. 17, FIG. 18, and FIG. 19, there will be described a preferred form of heating element, receptacle, internal wiring, thermostat and heating element plate of the automatic electric warming tray of my invention. Referring to FIG. 9, the molded warming tray tin has integrally molded to the underneath surface 11a of the heating surface, eight circular bosses or pads 25, ½" in diameter by 1/32" high beneath which is supported the heating element 26 to leave a circulating air space substantially the area of the heating element to produce by conduction and convection from the heating plate 26, a relatively mild and uniform heat on the under surface 11a of the warming tray so as to avoid hot spots and consequent charring of the thermo-setting plastic from which the warming tray is molded. Also integrally molded with the under surface of the warming tray and with the peripheral sides 12 and ends 13 of the warming tray are supporting bosses 27, the corner bosses 27' integrally molded with the feet 14, the bosses 27" integrally molded with the underneath surface 11a and to the ends 13 of the depending periphery of the tray. The supporting means or bosses 27, 27', and 27" are formed with root diameter and similarly spaced as the holes 17' in the bottom plate 16 to receive the self-tapping screws 17 which are ten in number. The heights of the bosses 27, 27', and 27" are 7/16" high to provide space for the fiberglass material 28 in sheet form ½" thick with overall dimensions substantially 10" x 16½" corresponding to the overall dimensions 10" x 16 1/16" of the heating element plate 26. Symmetrically arranged bosses 29 are integrally molded with the underneath surface 11a of the heating tray and with integrally formed ribs as shown in FIG. 9 to the depending sides 12 of the tray. These bosses 29 are 3/8" high, ½" diameter and also formed with the root diameter to detachably receive self-tapping screws 30. The self-tapping screws 30 affix the heating element plate 26 against the bosses or pads 25 through brackets 31, three in number as shown in FIG. 10 and a modified bracket 31a, the details of which will be particularly described with reference to FIG. 27. The brackets 31 are substantially V-shaped having a portion 31' in abutting relationship with respect to the under face of the heating element plate 26. A leg 31" extends vertically along side the boss 29 and at a lower end with reference to the normal position of the heating tray as a horizontal portion 31'" engaging the surface of the boss 29 and having a hole through which the self-tapping screws 30 extend for affixing the bracket 31 in assembled position against the underneath surface of the heating plate. The horizontal portion 31'" extends outwardly preferably in engagement with the inner face of the side 12 of the warming tray.

Referring to FIG. 10, FIG. 11 and FIG. 27, the bracket 31a is similar in shape to the bracket 31 of which there are three in number, but has an extended portion 32 having a downturned U-shaped portion 33 as viewed in FIG. 11 and FIG. 27. The downturned U-shaped portion 33 is complementally formed "fiberglass" sleeve 34 as shown in the exploded view of the sleeve 34 which is adapted to be slidably mounted over a thermostat 35 as shown in FIG. 18 and FIG. 27. The sleeve 34, formed of "fiberglass" is impregnated with silicone and is preferably 0.025" thick. The bracket 31a as well as the brackets 31 are preferably formed from plated steel of 1/32" thickness and substantially 3/8" wide. Rotation of the bracket 31a is prevented by the end of bracket 31a as the brackets 31 resting against the sides of the enclosure. However, the usual tolerances in manufacture may permit the bracket 31 to be spaced from the inner periphery as shown in FIG. 10 or in engagement therewith as also shown in the same figure. Rotation of the thermostat 35 which is somewhat oval in cross-section as shown in FIG. 27 is prevented by this shape of the thermostat and by indentation in the fiberglass sleeve 25 as illustrated in FIG. 27. The brackets 31 and 31a may be made of flat cold drawn steel or flat cold drawn steel and suitably plated if desired.

Referring particularly to FIG. 10 it is to be noted that the heating element plate 26 is prevented from transverse lateral movement with respect to the longitudinal axis of the warming tray by the inner edges of the symmetrically positioned bosses 29 to which are mounted the clamps 31 and 31a in engagement with the under surface of the heating element plate. Longitudinal movement of the heating element plate 26 with respect to the longitudinal axis of the warming tray is also prevented by the inner faces of the depending bosses 27" symmetrically positioned as shown. In view of the rigidity of the heating element plate 26 as it is clamped in position against the eight supporting bosses 25 by the clamp brackets 31 and 31a, the heating element plate is rigidly secured in place and also spaced from the underneath surface 11a of the heating surface 11 by the thickness of the pads or bosses 25. When the bottom plate 16 with the insulation 28 in place between the heating element plate 26 and the inner surface of the bottom plate 16 as shown in FIG. 3, FIG. 15, FIG. 16 and FIG. 17, the heating element plate 26 is suitably supported across its entire surface to prevent any undue sagging or warping when the electrical energy is applied to the heating grid 36 as illustrated in FIG. 10 or in the modified heating grid 36' of the heating element plate 26' as shown in FIG. 11. Referring to FIG. 10 and FIG. 18 and FIG. 19, the heating element plate 26 has an output rating of substantially 200 watts at 120 volts. The heating element plate 26 is preferably formed from sheet aluminum 37, FIG. 19, coated on both sides with porcelain enamel 38 having a minimum thickness of porcelain of substantially 0.015". The heating element plate 26 is painted by spraying through a mask to provide a uniform coating of metal to provide the grid-like pattern desired as shown, for example, in the grid-like pattern 36 of FIG. 10 or 36' of FIG. 11. The heating element panel is formed as disclosed and claimed in the U.S. Patent 2,939,807 granted on June 7, 1960, to D. A. Needham and assigned on its face to Thermway Industries, Inc., New York, N.Y., and forms no part of my invention except as disclosed and claimed in combination with the automatic electric warming tray of my invention. Terminals 39 may be secured to the ends of the grid by silver solder 40 as also disclosed in this U.S. Patent 2,939,807. It is also within the scope of the invention that the male terminals 39 may be of the form such as disclosed and claimed in Glynn 2,709,211, granted May 12, 1955, and secured in place by silver soldering and/or male connectors in the form as disclosed by E. W. Razlag, 2,787,693, granted April 2, 1957, and these male terminals form no part of my invention with the exception as disclosed and claimed in combination with the heating element as disclosed and claimed in connection with my automatic electric warming tray. It is also within the scope of my invention to use improved forms of male connectors secured by silver soldering to the grid-like terminals as will be disclosed later with reference to FIG. 20, FIG. 21, FIG. 22 and FIG. 23.

Referring to FIG. 10, FIG. 11 and FIG. 18, a receptacle 41 as manufactured by Cinch Cat. No. 14684 and rated at 7 amperes at 125 volts is affixed in a recess 42 molded as the warming tray is molded and formed contiguous thereto with holes for the reception of rivets or other securing means 43. The receptacle 41 is provided with prongs 44 to detachably receive the female plug or connection of a suitable cord set having a conventional male plug at the other end for detachably connecting the automatic electric warmer tray to a conventional electrical receptacle, and the cord set may be a conventional type S.P.–2 Power Cord Set, No. 18, Awg. (not shown).

Referring to FIG. 10, FIG. 11 and FIG. 18, the internal wiring comprises leads 45 and 46 suitably affixed by soldering to the respective terminals 45' and 46' of the receptacle 44. The terminal 45 at its other end is suitably affixed to a terminal of the thermostat 35. A lead wire 47 in series with the thermostat 35 and the lead 45 is suitably soldered to a female quick-disconnector 48, which in turn is complementally formed for attaching and detaching to the male quick-disconnect terminal or connector which is silver soldered at 40 to the terminal of the heating grid 36. The heating grid 36 terminating at its opposite end in the male quick-disconnect terminal and/or connector is complementally formed to receive a female type quick-disconnector 48 suitably soldered to the end of the lead wire 46. When connected in this manner, the heating grid 36 is operatively connected in series with the thermostat 35 which is clamped in heat transfer relationship to the heating element plate 26 as previously described and through the lead wire 45 to the other terminal of the receptacle 41 so that when the cord set (not shown) is connected to the receptacle 41 and to a wall receptacle or other source of electricity within the range of from 110 to 120 volts, the heating element 36 is suitably energized and controlled through the thermostat 35 so that the temperature of the heating surface 11 is within the predetermined temperature range for the automatic electric warmer tray. The internal wiring comprising the electrical leads 45, 46, and 47 are preferably impregnated asbestos insulation 1/32" thick and terminate in the quick-disconnect connectors 48 as described which employ means other than friction for securing the fit. The male type quick-disconnect terminals and/or connectors may be of the type No. 42411–2 Faston Tabs, silver plated and as manufactured by Amp, Inc. The female type quick-disconnect connectors are also preferably the type as manufactured by Amp, Inc. The "250" series Faston tab is preferably formed with a dimple on both sides such as illustrated in the modifications of FIG. 20, FIG. 21, FIG. 22 and FIG. 23. It may be fabricated with a clearance hole to provide clearance for the female type "250" series Faston receptacle as the end of the female receptacle in the manufacture thereof leaves a protruding end requiring clearance. Although it is preferred to use this type of quick-disconnect connectors, it is equally within the scope of the invention to use other conventional forms of quick-disconnect connectors, such as disclosed and claimed in the Razlag Patent 2,787,693, granted April 2, 1957, and also in the Glynn U.S. Patent 2,709,211, granted May 24, 1955. Although the connector as disclosed with reference to the Glynn patent may require a hole to weaken the tongue when used with resistant elements on glass plates, this construction is not necessary for the success of this invention. Therefore, it is preferred to use quick-disconnect connectors of the type as disclosed in Razlag 2,787,693 or the modifications thereof as disclosed with reference to applicant's improved form of terminal connector illustrated in FIG. 20, FIG. 21, FIG. 22 and FIG. 23 to be described later. It is also within the scope of the invention that the internal wiring of this invention may be used without quick-disconnect connectors and the ends of the lead wires 47 and 48 may be suitably soldered if desired to the tabs of the male-type connectors as described.

In fabricating the automatic electric warming tray of my invention, it is preferred to have the warmer tray fabricated as described including the heating element plate 26, the clamp brackets 31, 31a, fiberglass insulation 28 and the bottom plate 16. It is also preferred to have the receptacle 41, leads 45, 46, the thermostat 35 and the lead 47 with the leads suitably affixed to the terminals of the receptacle 41 and also to the female quick-disconnect connectors 48. This assembled internal wiring, including the receptacle may then be assembled to the molded warmer tray by affixing the receptacle 41 in the recess 42 by the rivets 43. The heating element plate 26 may then be assembled in place, the female quick-disconnect connectors 48 detachably connected to the male type quick-disconnect terminals or connectors 39 of the heating element plate and the insulating sleeve 34 assembled over the thermostat 35 and affixed in place against the underneath surface of the heating element plate with the clamp bracket 31a affixed to the warming tray as described. The clamping brackets 31 may then be suitably assembled further affixing the heating element plate 26 in position. The insulation 28 is then assembled in place and the bottom cover plate or bottom plate 16 suitably affixed in place. For repair or inspection of the warming tray, the parts are disassembled in the reverse order.

An automatic electric warming tray as described above and connected to a variable alternating current source within the range of conventional alternating current sources for household use when operated until well heated, with the heating element plate rated at 200 watts at 120 volts will give the following ratings:

| Volts | Amperes | Watts |
|---|---|---|
| 115 | 1.63 | 189 |
| 120 | 1.69 | 205 |
| 120.5 | -------- | 208 |

Under normal temperature tests wherein the device is connected to an alternating-current source adjusted to produce a calculated input of 208 watts. The warming tray was preferably placed on a soft wood supporting surface covered with a double layer of white tissue paper and operated until constant temperatures were attained. The test was then repeated with a pan of water on the surface.

RESULTS

| Location of thermocouples | Max. temp., deg. C. | |
|---|---|---|
| | Dry | Water |
| Supply cord at connector | 38 | 37 |
| Supply cord connector between female terminals | 45 | 46 |
| Supporting surface, under foot | 32 | 31 |
| Supporting surface, center | 47 | 47 |
| On element | 130 | 124 |
| Phenolic of receptacle inside | 50 | 47 |
| Fiberglass sleeving on thermostat | 86 | 78 |
| Surface temperature | 75 | 71 |
| Ambient | 25 | 26 |

*Abnormal temperature test*

With the device connected and mounted as in the normal temperature test, the warming tray was draped with a double layer of white cheesecloth and one-third of the surface (on the opposite end from the thermostat) was covered with a felt pad 1″ thick. The warming tray was operated until ultimate results occurred. This test was then repeated with ½, ⅔, and ¾ of the surface covered with the felt pad. With this test there was no flaming of the cheesecloth or the supporting surface, the felt was not charred, and no sparks or molten metal were emitted from the device. The warming tray as constructed as disclosed under insulation resistant tests showed the insulation resistance was in recess of 50,000 ohms. With the moisture abuse test with the dead-metal parts grounded through a 3 amp. fuse wherein the device was heated to normal operating temperatures and cold water poured over the surface, the 3 amp. fuse to ground was not rupture and the surface was not warped or cracked.

Under a mechanical abuse test, the device was connected and mounted as in a normal temperature test and the dead-metal parts grounded through a 3 amp. fuse, the warming tray was operated until well heated. An aluminum pan loaded to 4 lb. was dropped on the top surface from a height of 6″, and this was repeated ten times dropping the pan on different parts of the surface each time, and no current-carrying parts were exposed and the 3 amp. fuse to ground was not ruptured. The fiberglass tubing as used for the sleeve 34 under a dielectric strength test showed no evidence of an electric breakdown. Also in a dielectric strength test with the automatic electric warming tray still in a well heated condition after the input test, with a 60 cycle test potential applied between the current-carrying parts and the dead-metal parts, and the potential gradually increased from zero to 900 volts and maintained at 900 volts for a period of one minute, there was no evidence of dielectric failure.

Although its preferred to fabricate the heating element plate 26 having a heating grid such as illustrated at 36 in FIG. 10 or 36′ as in FIG. 11 with a terminal connection in both as illustrated in FIG. 18, wherein the input watts within the voltage range of from 115 to 120 may vary within the range of 189 to 208 watts to give the surface temperature within the range of from 70° C. to 75° C. as disclosed above with respect to the normal temperature test which may be obtained using a thermostat rated at 150° F. If different surface temperatures are desired, different thermostats may be substituted to give the range of temperature desired for the input wattage as described. It is also within the scope of the invention that other heating grid patterns may be utilized for the purpose intended, for example, if desired to have the surface temperature at one end of the tray at a different temperature than that of the other end of the tray. It is also within the scope of the invention that the electrical heating grid circuit may be suitably divided and separately controlled by thermostats having different temperature ratings in order to have the surface temperature of the warming tray at the temperature desired such as for keeping coffee or tear warmer than other food dishes which may be desired to be kept at a different temperature.

Figure 12:
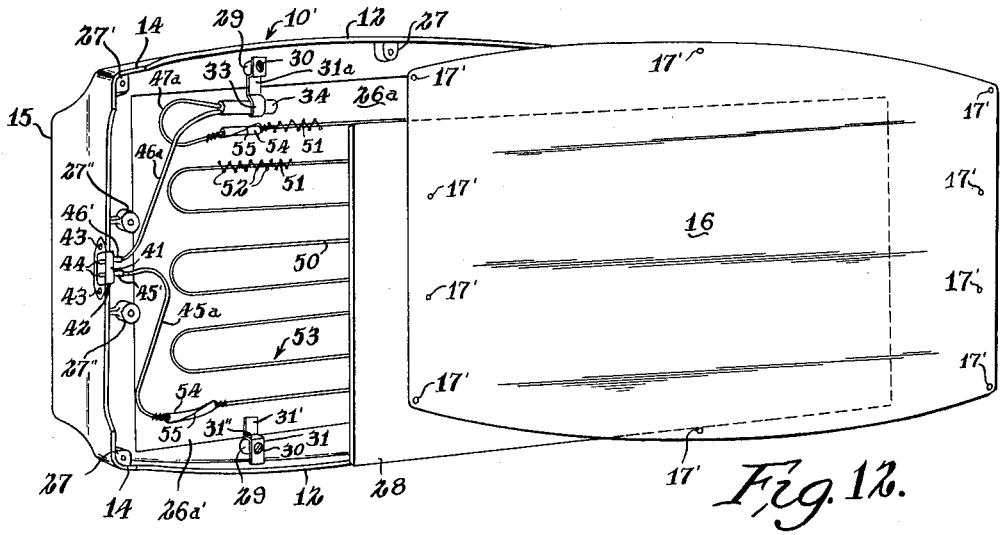
FIG. 12 is an exploded bottom view of the automatic electric food warmer tray illustrating a modified form of heating element and heating element support with the insulation and bottom plate detached.
Figure 13:
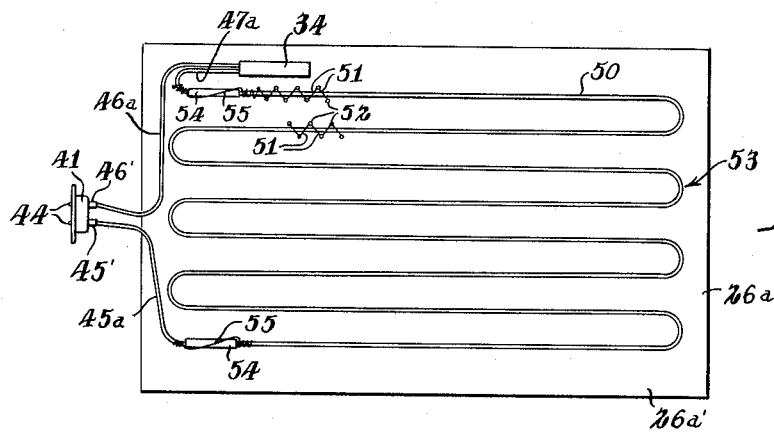
FIG. 13 is a bottom view of the modified embodiment of the heating element support and heating element and illustrating the receptacle and internal wiring including the thermostat and illustrating the stitching for affixing the wiring to the heating element plate.
Figure 14:
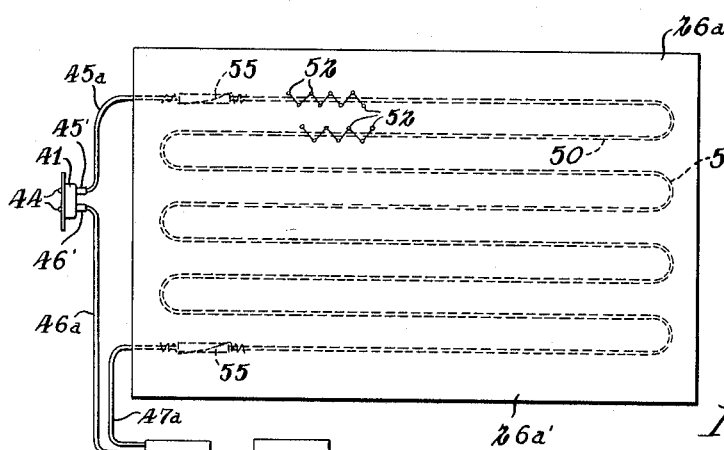
FIG. 14 illustrates the reverse side of the heating element plate of FIG. 13 illustrating the stitching and the insulation for the thermostat removed.

Although the heating element plate 26 as described with the embodiment of the automatic electric warming tray as described above is entirely satisfactory, the cost of this particular heating element plate 26 and/or 26′ places the price range of the warming tray in the more expensive class of trays of this type. In order to produce an automatic electric warming tray in a lower price range, there is disclosed another embodiment of a heating element 26a which will be particularly described with reference to the automatic electric food warmer tray 10′, illustrated in the disassambled embodiment of FIG. 12. Since the molded tray has been particularly described above along with the receptacle 41 and the internal wiring including the leads 45 and 46, the insulation 28 and bottom plate 16 there will only be described the heating element plate 26a with reference to FIG. 12, FIG. 13 and FIG. 14. The heating element plate 26a preferably includes an aluminum sheet 26a′ varying within the range of from 0.003″ to 0.005″ in thickness and having an overall area 10″ x 16″. The heating element 50 preferably comprises a copper alloy resistance wire in a grid-like pattern as shown in FIG. 13, the resistance wire of the grid 50 preferably insulated with triple unimpregnated fiberglass braid and wound on an asbestos core, with the total insulation thickness being 0.020" minimum. In the embodiment as illustrated in FIG. 12, FIG. 13 and FIG. 14, the heating element wire 50 is stitched in place to the aluminum sheet in the pattern as illustrated with fiberglass string 51, the stitching being as illustrated. In the stitching operation, the fiberglass string extends through holes 52 as made by the needle in the stitching operation, and the stitching as shown is repeated similarly on the reverse side of the aluminum sheet as illustrated in FIG. 14 so that there is formed a heating element plate 26a as illustrated in FIG. 13 and in FIG. 14 so that the heating element wire is suitably arranged to provide a grid-like heating element 53 in the pattern as shown. It is obvious that it is within the scope of the invention that the heating element wire 50 may be stitched in place in other patterns, for example, to form a grid-like element having greater heating capacity as to keep liquids such as coffee, tea and the like warmer than required for other foods being kept in a warm condition on the warming tray.

It is also desired to connect the terminal ends of the heating element wire 50 to the respective leads 45a and 47a by suitable quick-disconnect connectors well known in the art employing means other than friction for secure fit, and the splices at the heating element are preferably insulated with silicone impregnated fiberglass sleeving 54 which is stitched in place to the aluminum sheet 26a' by stitching 55 as illustrated in FIG. 12, FIG. 13 and FIG. 14.

The thermostat 35 is of the type as manufactured by Mechanical Industries, Inc., Cat. No. SU120M rated 14 amp., noninductive, 120 volt, A.C., and covered with silicone impregnated fiberglass sleeving 0.025" thick. As illustrated in FIG. 14, the fiberglass sleeving 34 is placed over the thermostat 35 and then placed in position as shown in FIG. 13 so that when the heating element plate 26a', as shown in FIG. 13, is assembled to the warmer tray as shown in FIG. 12, the enclosed thermostat is placed beneath the downturned U-shaped portion 33 of the clamp bracket 31a and is affixed to a boss 29 by the screw 30 as illustrated. Brackets 31 assemble the heating element plate 26a' to the other bosses 29 in the manner as described with respect to the first embodiment. Rotation of the thermostat 35 enclosed in the sleeve 34 is prevented by the indentation in the fiberglass sleeve 34, and the shape of the thermostat 35, for example, as described with reference to FIG. 27. Rotation of the bracket 31a is prevented by end of the bracket preferably formed to press against the enclosure formed by the side 12 of the warmer tray.

In this embodiment, the thermostat 35 is a 150° F. thermostat though it is to be understood that different temperature thermostats may be used depending upon the final resultant temperature desired at the warming surface, and if the grid is so arranged that there are different temperature gradients, suitable thermostats for the resultant temperature for each grid may be used in the circuit for the heating element grid and, the heating element grid may be formed if desired in series as shown, one or more sections in series depending upon the temperature required and where the heating element circuit is separated into two or more parallel circuits as described.

Although the fiberglass string may be used in the stitching of the heating element wire 50 to form the grid-like pattern 53, it is also within the scope of the invention that "Dacron" heat resistant stitching string may be used for stitching the heating element wire 50 in place as described.

Although this embodiment has been described with respect to the use of a Mechanical Industries, Inc., thermostat, it is also within the scope of the invention that a thermostat of the type as made by R.B.M. Control Division of Essex Corp., Logansport, Indiana, may be used for the rating desired to maintain surface temperature within the range desired. In this embodiment of the automatic electric food warmer tray with respect to the input tests wherein a test sample was connected to a variable alternating current supply source and operated until well heated, the following inputs were measured:

| Volts | Amperes | Watts |
|-------|---------|-------|
| 115   | 0.540   | 83    |
| 120   | 0.545   | 90    |

In connection with the dielectric strength test as described above there was no evidence that dielectric failed. In the normal temperature test as described above wherein this embodiment was connected to a regulated alternating current power source adjusted to 120 volts, operation was continued with the unit on a softwood supporting surface covered with a double layer of white tissue paper. The following constant temperatures were measured with the heated surface dry and empty during the test, as follows:

RESULTS

| Location of thermocouples: | Temp.-deg. C. |
|---|---|
| Supply cord at connector | 49 |
| Supply cord connector between female terminals | 52 |
| Supporting surface under foot | 52 |
| Supporting surface center | 51 |
| On element | 168 |
| Phenolic of receptacle, inside | 40 |
| Fiberglass sleeving on thermostat | 79 |
| Surface temperature, top of tray | 80 |
| Room | 26 |

It is to be noted from the above temperature test that the surface temperature is somewhat slightly higher than that with respect to the first embodiment although the heating element has less input wattage. However, in this embodiment the time to warm up is slightly longer.

Also with respect to insulation resistance tests, the insulation resistance was in excess of 50,000 ohms. In the moisture abuse test, the 3 amp. fuse was not ruptured and the surface was not warped or cracked. In the dielectric strength test on sleeving of heating element fiberglass insulation as made by Welcraft, there was no breakdown in the dielectric strength of the sleeving.

The above heating element plate as described with reference to the fabrication of a grid upon aluminum sheet metal forms no part of my invention with the exception as to the arrangement and the method of mounting the thermostat in combination with the molded plastic food warmer tray within the scope of the combination as disclosed and claimed. This particular heating element is understood to be within the scope of a patent application and/or patent of Welcraft, Inc., Lakeville, Indiana. The heating element plate 26a may be assembled as described with reference to FIG. 12 which is similar to the method of assembly of the receptacle thermostat, internal wiring and heating element of the embodiment of FIG. 9, FIG. 10 and FIG. 11. After the heating element 26a has been assembled, the insulation sheet 28 is placed in position and covers the heating element plate 26a since the overall size is 10" by 16½". The bottom plate 16 is then assembled in place to further support the heating element plate 26a in position against the bosses or pads 25 as described with reference to FIG. 9. For inspection and repair, the elements forming the automatic electric food warmer tray may be disassembled in the reverse order.

Referring to FIG. 15, FIG. 16 and FIG. 17 which are respectively a longitudinal cross-sectional view, a transverse cross-sectional view and an enlarged cross-sectional view, the elements of which have been previously described, there will now be briefly described the tray surface which has the raised edges 24 substantially ⅛" above the tray surface and conforming to the peripheral longitudinal sides 12 of the warmer tray. This raised edge along with the corresponding portion formed by the handles 15 prevents vessels for food and liquid placed upon the tray from sliding off. As described with reference to the ornamentation and method of applying the lithographed foil, the raised edges 24 may be suitably ornamented around to the parting edges 22 of the raised edges 24 and the parting edge 23 of the handles 15.

Referring to FIG. 18 and FIG. 19, the heating element 26 and the accessories including the quick-disconnect connectors, thermostat and construction of the heating element plate as shown in the enlarged view of FIG. 19, has been described above and further description is believed unnecessary.

Referring to FIG. 20, FIG. 21, FIG. 22 and FIG. 23, three embodiments are illustrated of a male type quick-disconnect connector of the type "250" series Faston tab as manufactured by Amp, Inc., for silver soldering to the terminals of the grid 36 as previously described and adapted for connecting to the female type, and the tab fits the "250" series Faston receptacle. It is also within the scope of the invention that quick-disconnect connectors as disclosed with reference to the Glynn Patent 2,709,211 granted May 24, 1955, and also electrical connectors as disclosed in the U.S. Patent No. 2,787,693 granted to Razlag on April 2, 1957, may be used without departing from the scope of the invention. Also other commercial forms of quick-disconnect connectors may be used which may be silver soldered to the ends of the terminals of a grid 36 as illustrated for example in the enlarged view of FIG. 18. Referring to FIG. 20 and FIG. 21, there is illustrated a male-type quick-disconnect connector 56 having a tab 57 struck out of a T-shaped slot 58 as are the commercial form of quick-disconnect connectors manufactured by Amp, Inc., identified above, including a dimple 49 for affixing the complementally formed female quick-disconnect connector 48 as illustrated in FIG. 18, employing means other than friction for a secure fit. Since the female connectors, such as fabricated by Amp, Inc., have a piece of metal extending axially corresponding to the portion of the metal in the automatic formation of these female connectors, it is necessary to provide a recessed dimple 59 to receive this slight extension so that the female quick-disconnect connector is securely affixed in place with the complementally formed engaging means for the female quick-disconnect connector operatively engaging the dimple 49. The completed male quick-disconnect connector is automatically formed from strip metal so that the resultant connector as it is formed may be considered as being fabricated in multiple steps in a suitable step die. The resultant connector 56 may be suitably plated for silver soldering to the terminals of a grid-like surface of a grid-like element 36 fabricated as disclosed and claimed in the U.S. Patent No. 2,939,807 granted to Needham on June 7, 1960.

Referring to FIG. 22 there is illustrated a modified male quick-disconnect connector 56' fabricated with a similar tab 57' including the dimple 49 but with a transversely extending groove 60 which serves the same purpose as the recess dimple 59. The extended portion of a female quick-disconnect connector such as manufactured by Amp, Inc., is received in the transverse extending recess 60 to prevent disconnection of the female quick-disconnect connector when affixed by the dimple 49. The resilience of the tab 57' because of the elongated recess 60 also prevents any stress by the connection formed by the tab 57' from being transmitted to a silver soldered joint when assembled to a heating plate of the type as disclosed in Needham and also Glynn.

Referring to FIG. 23, there is illustrated another embodiment 56" wherein the tab 57" also formed with the dimple 49 is additionally formed with a recess 61 formed by the struck out portion 62 formed by the slits 63. The purpose of this is the same as that as described with reference to FIG. 20 and FIG. 22 to provide clearance for the extended end of a female quick-disconnect connector of the type such as manufactured by Amp, Inc. It is within the scope of the invention that any of these embodiments of FIG. 20, FIG. 22 and FIG. 23 may be utilized as described with reference to the heating element plate 26 as disclosed in FIG. 10, FIG. 11 and FIG. 18 without departing from the scope of the invention.

Referring to FIG. 24, there is illustrated still another embodiment of my invention utilizing the same molded tray 10", receptacle 41, internal wiring including the leads 45a 46a, 47a, thermostat 35 and sleeve therefor 34. However, in this embodiment it is preferred to use a heating element 64 of a woven fibrous glass tape 65 illustrated in the enlargement thereof of FIG. 25 containing electrical conductors 66 in the selvage edges 67 into which a conductive silicone rubber, has been vulcanized under pressure. The woven fibrous glass tape 65 is identified as being "Patent Pending" as manufactured by Sunelec, Inc., Trenton, New Jersey. The fibrous glass tape 65 may be woven in any widths from ½". The tape also is continuously processed through a prototype machine constructed by Sunelec. This type of tape reaches destruction at a temperature of 900° F. This tape may also be operated at an ambient temperature of 400° F. continuously for a minimum of two hundred hours. The length of the tape forming the grid-like pattern 68 may be cut as desired, the temperature and wattage per increment of length being constant. It is within the scope of this invention to use tape of this type which is specified as varying from 0.5" to 54", however, it is preferred to use a tape of smaller range within the range having 0.5" heated area, 1.125" overall to a 1" heated area having a 1.625" overall dimension. The thickness of this type of tape varies from 0.005" to 0.01". The electrical specification is variable as to wattage requirement from a base of 5 ohms per cc. The current capacity is up to 5 amp. A.C. or D.C. (1.5 v. D.C. to 400 v. A.C.)

It is preferred that the woven tape 65 should be electrically insulated. Vinyl, Mylar, Teflon and fiberglass are among the satisfactory insulators. If maximum electrical insulation is desirable, a silicone coated fiberglass fabric is also satisfactory. The choice of insulator would depend on heat requirements and the degree of heat absorption that would be desirable for the particular use. Although the tape has been described as uninsulated it would be preferred to cover the tape 65 with tubular fiberglass braid with a total insulation of 0.020" minimum as described with reference to the embodiment of the heating element wire 50 of FIG. 13. There is illustrated schematically, suitable connectors 39' such as developed by Amp, Inc., to use with female type quick-disconnect connectors 48' which in turn are suitably connected as illustrated in FIG. 24 to the leads 45a and 47a as described previously in connection with the internal wiring, for example, the embodiment as described with reference to FIG. 10 and FIG. 11. However, if desired to connect the internal wiring directly to the terminal ends of the tape, these may be connected as described with reference to the embodiment of FIG. 12 and FIG. 13. Other suitable connectors which may be used are mechanical, crimp connections, soldering, welding and the terminals such as developed by Amp, Inc. In using the woven tape 65 in soldering, it is only necessary to scrape the silicone rubber from the both tape edges 65 and then solder the conductors 66 to each selvage edge to standard electric wire. With this particular type of tape having conductors 66 in selvage edges, if it is desired to have parallel circuits formed by the conductors in the selvage edges, the terminal 39' could connect the conductors in both selvage edges. If it is desired to connect the conductors 66 in series, the ends of the conductors of the edges of the tape at one end of the grid-like pattern could be conneced together, and at the opposite end, if desired to have a series circuit, terminals could be suitably connected to the conductors at the end of the tape separately and the internal wiring connected to these terminals. Other suitable circuit arrangements are within the scope of this invention to those skilled in the art.

This particular flexible heating tape as manufactured by Sunelec is very satisfactory for a range of surface temperatures of from 120° F. to 170° F. This particular flexible heating tape permits a 50° (approximate) rise in temperature with each increase of one watt per square inch in a 70° F. ambient when suspended in air as would be the case in this warming tray. Thus a section of one watt per square inch of this flexible heating tape will achieve a surface temperature of about 120° in an average room. A two watt per square inch section would achieve about a 170° surface temperature in that same room. Obviously any variation in use environments such as surface, insulation, etc., will change the tape surface temperature. If it is desired to change the temperature requirements of the heating surface of the warming tray, a powerstat may be employed with a sample section of Sunelec tape to control the voltage and therefore temperature under specific conditions. With the desired temperature achieved through a specified voltage on the sample tape, this data may be translated so that a tape of the desired temperature (w.p.s.i.) may be supplied for use on a selected voltage such as used in homes within the range of from 110 to 120 volts. With flexible heating tape as described, the temperature remains substantially constant over the entire heated area of the warming tray surface.

Referring to the embodiment of FIG. 24, the flexible insulating tape 65 preferably insulated with fiberglass braid 69 after having been arranged in the grid-like pattern 68 and with the internal wiring connected as shown may be suitably held in place against the underneath side of the heating tray by fiberglass tape 70 which may cover two elements of the insulated flexible tape and be suitably cemented to the underneath side of the molded plastic tray 10″. Other fiberglass tape may tape down the U-shaped ends of the grid 68′ for affixing the ends of the grid to the underneath surface of the molded warmer tray. Similar glass fiber tape elements 71 may also be used to affix one single leg to the grid as illustrated at the lower end of the tray in FIG. 4, and likewise the upper leg may be similarly secured. Both of these legs of the grid are those connected to the terminals of the internal wiring. A fiberglass tape element 70 may also be used to affix the thermostat 35 and the glass sleeve 34 therefor and the terminal legs of the grid to the underneath surface of the tray. For securing the middle of the grid 68 to the underneath surface of the tray, similar fiberglass tape elements 71 may be used as described with reference to the terminal legs of the grid and flexible tape elements 70 may also be used for affixing contiguous legs of the grid 68 to the underneath surface of the tray by a suitable cement or adhesive which will withstand the temperature of the underneath surface of the tray to which the grid is affixed. It is to be understood that other convenient lengths, corresponding to the flexible tape elements 70 and 71 may be used without departing from the scope of the invention, for example, the flexible tape elements may be applied in continuous lengths and cemented in place corresponding to the widths of the grid portions where the tapes are applied. It is to be understood that these flexible fiberglass tape elements may be prefabricated first and applied as the heating element as assembled in place.

In the embodiment as illustrated in FIG. 4, although it is necessary to have the tray molded with the supporting bosses 27, 27′ and 27″ for detachably affixing the bottom plate 16 (not shown) but as previously described, it would be unnecessary to have the bosses 29 integrally molded as previously described with reference to FIG. 9 since the grid-like pattern 68 is held in place with fiberglass tape as described. However, to reduce the number of molded trays in order to have one standard model, either in plain or ornamented as described, it is more desirable to have the molded warmer tray provided with not only the bosses 27, 27′ and 27″ but also the symmetrically arranged bosses 29 which were previously described for mounting the clamp brackets 31 and 31a, the bracket 31a adapted for mounting the thermostat 35 and its insulating sleeve 34.

It is also within the scope of the invention, referring to FIG. 26 that a modified form of heating element plate 26b similar to the heating element plate 26a of FIG. 13 may be used. In the modified heating element plate 26b of FIG. 26, Sunelec flexible heating tape 65 as described with reference to FIG. 25 and with suitable insulation 69 stitched in place on a heating element support 26b′ of sheet aluminum within the range of from 0.003″ to 0.005″ thick as previously described with reference to FIG. 13 and the insulated flexible heating tape 65′ is stitched in place with fiberglass string or Dacron heat-resistant thread 51′ as described with reference to FIG. 13 and FIG. 14, the needle as the flexible heating tape 65′ is stitched in place perforates the sheet aluminum in the holes 52. The flexible insulating tape 65′ has the quick-disconnect connectors 39′ affixed to the conductors 66 as previously described, and the quick-disconnect connectors 39′ are complementally formed to the complementally formed female quick-dsconnect connectors to which the terminal leads 47a and 45a may be attached as illustrated in FIG. 24. In this embodiment the heating element plate 26b, together with the thermostat 35 and its insulating sleeve 34, may be assembled in place with the clamp brackets 31 and 31a as illustrated in the dotted lines above and also as described with reference to FIG. 12, wherein the thermostat 35 and its insulating sleeve 34 is clamped in place against the surface of the heating element plate 26b as illustrated in the dotted insulating sleeve 34′ within which the thermostat 35 is mounted as illustrated in FIG. 24.

It is also within the scope of the invention that instead of stitching the flexible heating tape 65′ to an aluminum foil sheet 26b′, the insulated and/or flexible heating tape 65′ may be suitably stitched to a suitable insulating sheet such as mica, fiberglass either in sheet form or woven and suitably impregnated or other types of insulators which will suitably insulate and withstand the heat developed by the flexible heating tape within the range of temperature desired to produce the necessary surface temperature on the warming tray. It is also within the scope of the invention that the Sunelec flexible heating tape may be suitably insulated between sheets of vinyl, Mylar, Teflon, and fiberglass with the flexible heating tape stitched between the insulating sheet.

Referring to the embodiment of FIG. 24 and the modification of FIG. 26, after the heating element plate 26b, for example of FIG. 26, is installed or after the grids 68 of FIG. 24 are installed the fiberglass insulating sheet 28 as previously described may be placed over the heating element or heating plate and the bottom plate 16 suitably affixed in position.

Referring to FIG. 28 and FIG. 29, there is illustrated modified forms of automatic electric food warmer trays 72 of FIG. 28 and a further modification of the food warmer trays 73 of FIG. 29. In each of these embodiments, a heating element plate 74 similar to the heating element plate 26 as described with reference to the embodiment of FIG. 10 and FIG. 11 is utilized. The heating element plates 74 for each of the embodiments of FIG. 28 and FIG. 29 is preferably formed from sheet aluminum coated on both sides with porcelain enamel with a minimum thickness of porcelain of 0.015″. The heating element plate has a grid-like heating element 36 painted on one side and fabricated in accordance with the disclosure and claims of the U.S. Patent No. 2,939,807 granted to Needham—June 7, 1960. In these embodiments, the heating element plate 74 forms the heating surface of the warming tray and also provides the necessary support for vessels with food and liquids being warmed thereon.

Referring to the embodiment of FIG. 28, the food warmer tray 72 has substantially the same shape as the food warmer tray as described with reference to FIG. 1 provided with similar legs 14, depending sides 12 and ends 13 with handles 15 integrally molded thereto and a peripheral heating surface 11' in addition to that formed by the heating element plate 74 so that the overall upper peripheral surface of the embodiment of FIG. 28 is similar to the upper heating surface 11 of the warmer tray 10 of FIG. 1. The longitudinal edges of the warmer tray are also formed with raised edges 24 to restrain any vessels being carried on the warming tray. Integrally molded with the peripheral extension 11' of the heating surface is a rectangular recess 75 complementally formed to the periphery of the heating plate 74. It is preferred to integrally mold in the recessed rectangular edge 75, holes having integrally molded root diameters to receive self-tapping screws 79. It is preferred to have the longitudinal edges formed with these screw holes and similarly the screw holes in each end edge of the recess edge 75. It is also within the scope of the invention that the heating plate 74 may be complementally formed about a raised annular periphery of each hole to provide suitable insulation with respect to any contact of the screws 79 with any exposed metal of the heating plate. It is preferred that the holes in the heating plate shall be prepunched before the heating plate is porcelainized so that the heating plate is electrically insulated. In order to affix the heating element plate 74 in position, similar molded or extruded insulating strips 80 are provided for each longitudinal edge and similar shorter complementally formed insulating strips 81 are formed to the insulated strips 80 with the ends mitered as illustrated. As described with reference to the heating element plate 26 of FIG. 10, a suitable receptacle 41 (not shown) internal wiring including the necessary leads connected to the terminal of the receptacle and that of the terminal of the heating grid as described with reference to FIG. 10, together with a thermostat 35 with its glass sleeve 34 clamped in position against the underneath surface of the heating element plate 74, are assembled after insulation 28', similar to the fiberglass insulation 28 of FIG. 11 is assembled in a complementally formed depending recess 82. The recess 82 has depending integrally molded sides 83 and end edges 84 and also an integrally molded bottom 85 integrally molded to the depending sides and end edges 83 and 84. With the recess 82 constructed as described, a fully enclosed bottom integrally molded with the rest of the warmer tray is provided to support the insulation sheet 28' which in turn acts as a support for the underneath surface of the heating element plate 74 and provides suitable insulation for the grid 36 to direct the heat upwardly to the warming surface.

Although fiberglass insulating material, for example, ½" thick with an overall dimension of substantially 10" x 16½" may be used underneath the heating element plate 74, it is also within the scope of the invention that an expanded insulation such as poly-urethane may be used which when expanded seals the entire recessed space underneath the heating element plate 74 and during the expansion of the insulating material suitably seals the underneath surface of the heating element plate and the edges, and with the molding and/or insulating strips 80 and 81 suitably cemented with a waterproof cement if necessary, and with the receptacle 41 for the cord set also suitably sealed, it is within the scope of the invention that the entire warmer tray may be immersed in water for cleaning.

It is also within the scope of the invention that the extended integrally molded portions of the upper heating surface 11' and the upper surface of the handle 15 may be suitably ornamented with wood grain patterns or other ornamentation with lithographed foils as described with reference to FIG. 5, FIG. 6, FIG. 7 and FIG. 8. Also the integrally molded portions of the trays may be formed with a colored melamine and/or melamine phenolic molding powder to have suitably colored trays or colored depending portions in contrast to the lithographed surfaces of the edge of the heating surface and handles. It is also within the scope of the invention that although it may be preferable to form the upper porcelain surface of the heating element plate 74 of white porcelain, the porcelain of the upper surface may be suitably colored for further ornamentation. It is also within the scope of the invention that the white or colored upper porcelainized surface of the heating element tray 74 may be suitably ornamented with metallic designs by spraying, metallic foil, or by silk screening of the metallic material which may be suitably glazed and/or fused to the surface of the porcelain providing the upper surface of the heating tray, for example, as the patterns as illustrated in FIG. 7 and FIG. 8 although other suitable ornamentation such as used in ornamentation of dishes and the like as well as glassware may be utilized.

Referring to FIG. 29, a modified food warmer tray to that of FIG. 28 is illustrated, the only difference being instead of having integrally molded handles 15 and the shape as illustrated in FIG. 8 corresponding to that as described with reference to the embodiment of FIG. 1, the tray portion is rectangular in shape having the depending longitudinal sides 12' and short ends 13'. The heating element plate 74 is secured in place by the molded or extruded insulating strips 80 and 81 by the screws 79. The insulating strips 80 and 81 in both embodiments, for example, may be one-fourth inch wide and one-eighth inch thick to provide a slightly raised edge above the top of the heating surface 74 to retain the vessels holding food and water from sliding off the surface of the tray during the transportation of the tray. The rectangular annular periphery 11" may be suitably ornamented with integrally molded lithographed foils as described with reference to the embodiment of FIG. 28 and those of FIG. 5 and FIG. 6. Instead of having integrally molded handles 15, the embodiment of FIG. 29 is provided with symmetrically formed detachable handles 15' as illustrated which may be formed from melamine and/or melamine phenolic plastic, either in colored plastic or with a lithographed grain surface such as described previously with respect to the wood grains of the surfaces of the heating surface and handles of the embodiments of FIG. 5 and FIG. 6. It is also within the scope of the invention that the handles may be formed from ornamental wood such as walnut or they may be die cast from suitable metal and suitably plated in chrome or other ornamented colors. The handles 15' may be detachably affixed to the ends 13' of the warming tray 73 as illustrated by screws or other suitable fastening devices.

Although each of the embodiments of FIG. 28 and FIG. 29 has been particularly described as having a porcelain enamelled surface—either plain, colored or ornamented, it is also within the scope of the invention that the heating element plate 74 may be fabricated from stainless steel and only with the bottom alone or the bottom and the peripheral edges corresponding to the width of the insulating strips 80 and 81 may be suitably porcelainized for insulation and the heating grid 36 applied as previously described. This will provide a highly polished stainless steel surface which may be suitably bordered, either by the plain color of the molded or colored plastic, or by the lithographed wood graining of the plastic of the peripheral surface 11". With a stainless steel surface, it is possible to cook thereon however, it is preferred as illustrated in FIG. 30 to provide a detachable recessed griddle 86 having a peripheral edge 87 including the longitudinal edges 88 and the opposite end edges 89 complementally formed to fit in the recessed edge 75 as illustrated in FIG. 28 and with the depending griddle or cooking surface 90 to be received within the space provided by the sides 83 and ends 84 of the recess 82 which receives the insulation 28'. The sides 88 and ends 89 are perforated with holes 79' to complementally receive the integrally molded raised edges of complementally formed holes within the rectangular recess 75 which receives a self-tapping screw 79 to detachably affix the recess griddle 86 or the heating element plate 74 in position on the rectangular recess 75 of the embodiments of FIG. 28 or FIG. 29. The bottom surface 90' of the depending griddle 90 formed by the depending side edges 88' and end edges 89' integrally formed with the respective edges 88 and 89 are porcelainized along with the underneath surfaces of the edges 88 and 89, and if desirable over the upper edges thereof corresponding to the width of the insulating strips 80 and 81 to suitably electrically insulate the grid surface 36a as formed thereon as disclosed and claimed in the patent to Needham 2,939,807 granted June 7, 1960. Suitable quick-disconnect detachable terminals 39 may be silver soldered in place as also described with respect to the terminal ends of the grid 36a.

In either of the embodiments of FIG. 28 or FIG. 29, the warming tray may be provided either with a heating element plate 74 and with a griddle 90 which are interchangeable. It is also within the scope of the invention that each of these embodiments may be either with the heating element plate 74 or with the grid 90 and one may purchase either the heating element plate 74 or the griddle 90 to interchange. When the heating element plate 74 and the griddle 90 is used it is preferred to use an adjustable thermostat, adjustable within the temperature range of from 150° F. to 425° F. to provide the desired temperature range for the types of food which may be cooked and served with this combination warming and cooking tray. It is possible to produce the required temperature range by providing a suitable grid 36a to have suitable input wattage to produce the temperatures desired. It is to be understood that other forms of heating elements may be utilized as is well understood in the art to provide the necessary cooking temperatures without departing from the scope of this invention. Although the heating element plate 74 and the griddle 90 have been described with reference to attaching and detaching by removing securing means such as screws 79, it is also within the scope of the invention that other forms of securing devices may be used such as clips mounted on the underneath surface of the heating element plate 74 or griddle 90 and complementally formed latching means either integrally molded to the interior periphery of the bottom recess 82 or detachably mounted thereon also without departing from the scope of this invention so that the heating element plate 74 and the griddle 90 may be simply removed by raising each of these members upwardly against the resilience of the clips holding them in place and then snapping them back in place after these elements have been cleaned or interchanged.

It is thus evident that there has been described an automatic electric food warmer tray wherein the body portion thereof may be suitably molded from a thermosetting plastic material such as melamine and/or melamine phenolic molding powder by compression molding, and other parts of which may be separably fabricated such as the heating element plate, the internal wiring, the thermostat, the receptacle for the internal wiring, the insulation and the bottom plate and assembled to provide a completed warming tray.

There has also been described a suitable method of applying lithographed foils impregnated with melamine to provide an ornamented heating surface and/or the upper surfaces of the handles which may be integrally molded or separably formed and affixed to the body portion of the molded warmer tray to provide ornamental surfaces in wood grain or floral or other suitable patterns which are not effected by the heated surface of the warmer tray. The insulation for the warmer tray may be suitably formed from fiberglass material or from suitably expanded material such as poly-urethane to provide insulation which may be integrally affixed with the warmer tray sides and ends and bottom plate and to the heating element to provide a warmer tray which may be immersed in water if necessary.

It is also obvious that there has been described an automatic electric food warmer tray including the molded body portion and the heating element therefor which when connected to a source of alternating current will provide suitable input wattage to maintain the temperature of the surface of the warming tray within the range of temperature desired for warming foods and liquids thereon, or if further desired within the necessary range of temperatures for cooking or grilling foods thereon.

It is also obvious that there has been described an improved automatic electric food warmer tray which withstands normal temperature tests and abnormal temperature tests within the range of temperatures for warming or heating food thereon and also in which a completed warming tray withstands suitable dielectric strength tests with no evidence of dielectric failure.

It is also obvious that there has been disclosed an automatic electric food warmer tray which withstands conventional insulation resistance tests, moisture abuse tests and mechanical abuse tests, and also the dielectric strength tests of any insulation as used.

It is further evident that there has been described an automatic electric food warmer tray wherein the plastic heating surface is impervious and may be readily wiped clean without the need of immersion in water for cleaning, and also an automatic electric food cooking tray in which the warming or cooking surface may be detached if necessary for cleaning and replacement, and if necessary when the warming and/or cooking tray is provided with expanded insulation fully sealing all parts of the electrical circuit may be cleaned by immersion if necessary.

It is within the scope of the invention that the plastic body portion of the warmer tray may be formed from any suitable thermo-setting plastic material which will withstand charring and hot spots preferably being molded by compression molding at a predetermined temperature and pressure. It is preferred to use a plastic material having a high impact strength such as melamine and/or melamine phenolic and which will also resist charring, the formation of hot spots with a heating element placed close to the underneath side of the molded plastic heating surface.

It is also within the scope of the invention that heating element plates may be formed with an electric grid suitably formed on a porcelainized sheet with the porcelain either on both surfaces or on one surface and wherein the heating element plate may be used to heat the heating surface or may be used as the heating or cooking surface.

It is also evident that there has been disclosed another form of heating element plate in which the electric grid is formed from electric resistance wires suitably insulated and stitched to a flexible foil-like sheet of aluminum to reduce the cost of the heating plate.

It is also evident that there has been disclosed still another form of electric heating element for a warmer tray using Sunelec flexible heating tape suitably insulated and affixed to the underneath surface of the molded plastic warmer tray, or suitably stitched to a foil-like aluminum sheet, and/or it may be also be formed from an insulated flexible heating tape which may be suitably positioned between insulating sheets such as vinyl, Mylar, Teflon and fiberglass and other suitable insulators to provide the necessary temperature of the heating surface of the warmer tray and/or cooking surface if so desired.

Obviously there has been disclosed an improved form of automatic electric food warmer and/or cooking tray from suitable thermo-setting plastic and fabricated heating elements with the necessary thermostatic controls which is economical to manufacture, and which may be suitably manufactured using conventional methods in the fabrication of the body portion of the warmer tray from suitable molding plastics and conventional methods of molding and also conventional methods of fabrication of the heating elements therefor.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. The method of making a portable warmer tray for heating foods, which comprises the steps: molding from a thermo-plastic material a one-piece warmer tray including a heating surface of a predetermined geometrical shape, handles integrally formed at opposite ends with respect to an axis of the heating surface, and sides including bottom feet whereby the outer surfaces formed are continuous and the heating surface may withstand a relatively mild and uniform heat on the under-surface of the heating surface without hot spots and consequent charring of the thermo-plastic material of the portable warmer tray.

2. The method of making a portable warmer tray for heating foods, which comprises the steps: molding from a thermo-setting plastic material, a one-piece warmer tray including a heating surface of a predetermined shape, handles integrally formed at opposite ends with respect to an axis of the heating surface, and sides including bottom feet whereby the outer surfaces formed are continuous and the heating surface may withstand a relatively mild and uniform heat on the under-surface of the heating surface without hot spots and consequent charring of the thermo-setting plastic material of the portable warmer tray.

3. The method of making a portable warmer tray for heating foods, as defined in claim 2, wherein the thermo-setting plastic material is a "Cymel" molding compound by compression molding under heat and pressure and in a predetermined cycle.

4. The method of making a portable warmer tray for heating foods as defined in claim 2, wherein the thermo-setting plastic material is a melamine plastic material.

5. The method of making a portable warmer tray for heating foods as defined in claim 2, wherein the thermo-setting plastic material is a composition of the group consisting of a melamine material and a phenolic substance so that the resistance to heat is increased without hot spots and charring of the thermo-setting plastic material of the portable warmer tray.

6. The method of making a warmer tray for heating foods and in a predetermined size and shape, which comprises the steps: molding from a thermo-setting plastic material, a one-piece warmer tray including a heating surface of a predetermined geometrical shape, handles integrally formed at opposite ends with respect to an axis of the heating surface, and sides including bottom feet whereby the outer surfaces formed are continuous and the heating surface may withstand a relatively mild and uniform heat on the under surface of the heating surface without hot spots and consequent charring of the thermo-setting plastic material, and said step of molding being by compression molding under heat and pressure and in a predetermined cycle.

7. The method of making a decorated warmer tray for heating foods and in a predetermined size and shape and with a decorative heating surface, which comprises the steps: molding from a thermo-setting plastic material, a one-piece warmer tray including a heating surface of a predetermined geometrical shape and to which is applied a predetermined ornamental surface by fusing a foil-like ornamental sheet including thermo-setting plastic material to the thermo-setting plastic material of the heating surface under heat and pressure whereby the heating surface is decorated with the foil-like ornamental sheet providing an ornamental heating surface.

8. The method of making a warmer tray for heating foods and in a predetermined size and shape and with a decorative heating surface, which comprises the steps: molding from a thermo-setting plastic material, a one-piece warmer tray including a heating surface of a predetermined size and handles integrally formed at opposite ends with respect to an axis of the heating surface to which is applied a predetermined ornamental surface by fusing a foil-like ornamental sheet of paper impregnated with a thermo-setting plastic material to the thermo-setting material of the heating surface and the handles under heat and pressure whereby the heating surface and surface of the handles to which the foil-like ornamental sheet is applied are decorated and integrally formed with the foil-like ornamental sheet providing an ornamental heating surface and ornamental handles.

9. The method of making a colored and decorative warmer tray for heating foods and in a predetermined size and shape and with a decorative heating surface, which comprises the steps: molding from a colored thermo-setting plastic material a one-piece warmer tray including a heating surface of a predetermined shape and handles integrally formed at opposite ends which respect to an axis of the heating surface to which is applied a predetermined ornamental surface by fusing a foil-like ornamental sheet of thermo-setting plastic material different in color from that of the material for the heating surface and the handles under heat and pressure whereby the heating surface and surface of the handles to which the foil-like ornamental sheet is applied are decorated and integrally formed with the foil-like ornamental sheet providing a warmer tray of one color and the surface of the heating surface and handles with another color.

10. The method of making a colored and decorative warmer tray for heating foods and in a predetermined size and shape and with a decorative heating surface, which comprises the steps: molding from a colored thermo-setting plastic material, a one-piece warmer tray including a heating surface of a predetermined shape and handles integrally formed at opposite ends with respect to an axis of the heating surface to which is applied a predetermined ornamental surface by fusing a foil-like colored lithographed paper sheet impregnated with thermo-setting plastic material of a predetermined colored design different in color from that of the material for the heating surface and the handles and also contrasting to the colored lithograph thereon under heat and pressure whereby the heating surface and surface of the handles to which the foil-like colored lithographed sheet is applied are decorated and integrally formed with the foil-like colored lithographed paper sheet providing a warmer tray of one color and the surface of the heating surface and handles with another color of the material of the foil-like sheet and the lithographed design applied in its predetermined colored design pattern and arrangement.

11. The method of making a colored and decorative warmer tray for heating foods as defined in claim 10, wherein the thermo-setting plastic material for the warmer tray is a composition of the group consisting of a melamine material and a phenolic substance and the foil-like colored lithographed sheet for the decorative surface is a melamine material so that the resistance to heat is increased without hot spots and charring of the thermo-setting plastic material of the portable warmer tray.

12. The method of making an ornamentive surface for a molded plastic tray which withstands hot spots and consequent charring of the plastic, which comprises the steps: molding from a thermo-plastic setting material, a tray surface and applying a predetermined ornamental surface by fusing a foil-like ornamental sheet including a thermo-setting plastic material for the tray surface under heat and pressure, whereby the tray surface to which the ornamental sheet is applied is decorated and integrally formed with the foil-like ornamental sheet providing a molded plastic tray surface with an ornamentive surface, said thermo-setting plastic material of said tray and said foil-like ornamental sheet is a composition of the group consisting of melamine material and a phenolic substance for the tray and for the foil-like sheet, a melamine material so that resistance to heat is increased without hot spots and charring of the thermo-setting material of the tray and tray surface.

13. A warmer tray for heating foods comprising a one-piece molded tray construction including a heating surface of a predetermined geometrical shape, sides and bottom feet forming continuous surfaces, said molded tray construction formed from a thermo-setting plastic material, an electrical resistance heating element uniformly spaced from the underneath surface of the heating surface, integrally molded means integrally molded with the heating surface for uniformly spacing the heating element below the bottom surface of the heating surface, securing means for detachably mounting the heating element to the bottom surface of the heating surface, an electrical receptacle for an electrical cord set affixed to a side of the warming tray, internal wiring including thermostat means operatively connected to the resistance heating element, detachable means for affixing the thermostat means in contact with the heating element, insulation means complementally formed to the surface of the heating element and contiguous thereto, a sheet metal bottom plate complementally formed to the inner periphery of the sides, means for mounting the bottom plate peripherally spaced and integrally molded contiguous to the inner periphery of the sides, and detachable securing means, complementally formed to said means for mounting the bottom plate and for detachable affixing the bottom plate to the bottom of the tray in contact with the insulating means, and said insulating means contacting the bottom face of the heating element.

14. A warming tray for heating foods as defined in claim 13, wherein said molded tray is molded from a thermo-setting plastic material comprising a composition of the group consisting of a melamine material and a phenolic substance so that the resistance to heat of the heating surface is increased without hot spots and charring of the thermo-setting plastic material from which the warming tray is molded.

15. A warming tray for heating foods as defined in claim 13, wherein said molded tray comprises handles integrally formed at opposite ends with respect to an axis of the heating surface.

16. A warming tray for heating foods as defined in claim 13, wherein said heating surface comprising handles integrally formed at opposite ends with respect to an axis of the heating surface comprises a foil-like colored lithographed sheet including thermo-setting plastic material of one color fused to the thermo-setting plastic material of the heating surface and the handles of a different color providing an ornamental heat resistant surface and ornamented handles contrasting to the color of the sides, and underneath surfaces of the handles and the interior surfaces of the molded tray.

17. A warming tray for heating foods as defined in claim 13, wherein said heating element includes a woven fibrous glass tape comprising electrical conductors in the selvage edges into which a conductive silicone rubber has been vulcanized under pressure, said woven fibrous glass tape arranged in a predetermined grid-like pattern, and securing means for holding the tape with a thermo-setting adhesive to the underneath side of the heating surface.

18. A warming tray for heating foods as defined in claim 13, wherein said heating element is a radiant heater comprising a sheet of metal coated upon both sides with porcelain enamel, a grid-like resistance element providing an electrical circuit on one face of the porcelain coated sheet of metal, terminals affixed to the ends of the circuit for connecting the internal wiring, and said heating element affixed to the underneath side of the heating surface with the grid-like resistance element positioned with the porcelain coated sheet metal intermediate the heating surface and the grid-like resistance element providing substantially uniform surface temperature throughout the heating surface under control of the aforesaid thermostat means in contact with the underneath surface of the heating element.

19. A warming tray for heating foods as defined in claim 18, wherein said terminals connecting said resistance element and the internal wiring are complementally formed male and female quick-disconnect connectors, said male quick-disconnect connectors affixed to the ends of said electrical resistance element by silver soldering.

20. A warming tray for heating foods as defined in claim 13, wherein said heating element includes a heating element resistance wire wound on an asbestos core and insulated with triple unimpregnated fiber glass braid, a heating element support of a predetermined shape substantially that of the heating surface and formed of sheet aluminum within the range of from substantially 0.003" to 0.005" in thickness, said insulated heating element resistance wire arranged in a predetermined grid-like pattern on a face of the aluminum sheet, and said insulated heating element wire stitched in place with an insulating string in the predetermined grid-like pattern.

21. A warming tray for heating foods as defined in claim 20, wherein the ends of the heating element resistance wire are electrically connected to the internal wiring.

22. A warming tray for heating foods as defined in claim 13, wherein said heating element includes a woven fibrous glass tape comprising electrical conductors in the selvage edges into which a conductive silicone rubber has been vulcanized under pressure, a heating element support of a predetermined shape substantially that of the heating surface and formed of sheet aluminum within the range of from substantially 0.003" to 0.005" in thickness, said woven fibrous glass tape arranged in a pre-determined grid-like pattern on a face of the aluminum sheet, and said woven fibrous glass tape stitched in place with an insulating string in the predetermined grid-like pattern.

23. A warming tray for heating foods, comprising a one-piece molded tray construction including a molded recess, sides and bottom feet, said molded recess formed from a thermo-setting plastic material and complementally formed to detachably mount insulation means, a heating surface including an electrical resistance heating element for supplying radiant heat to said heating surface, an electrical receptacle for an electrical cord set affixed to a side of the warming tray, internal wiring including thermostat means operatively connected to the resistance heating element, said thermostat means operatively mounted with respect to the heating element for maintaining the predetermined temperature of the heating surface, said heating surface comprising a sheet of metal coated upon both sides with porcelain enamel, a grid-like resistance element providing an electrical circuit on one face of the porcelain coated sheet of metal, and said grid-like resistance element providing substantially uniform surface temperature throughout the heating surface under control of the aforesaid thermostat means in contact with the underneath surface of the heating element.

24. As an article of manufacture, a one-piece molded former tray from a thermo-setting plastic, said warmer tray including a heating surface of a predetermined geometrical shape, handles integrally formed at opposite ends with respect to an axis of the heating surface, a peripheral depending base providing a recess beneath the heating surface and including bottom feet whereby the outer surfaces formed are continuous, support pads integrally molded to the underneath surface of the warmer tray for uniformly spacing a heating element with respect to the underneath surface of the heating surface, support means peripherally spaced about the inner peripheral surface of the depending base and integrally molded therewith and to the underneath surface of the warmer tray for detachably mounting a bottom plate spaced from the heating surface and for enclosing the recess beneath the heating surface, and additional support means intermediately spaced between certain of said support means and integrally molded to the underneath surface of the heating surface for mounting securing means for affixing the heating element against the outer face of the support pads for the heating element.

25. As an article of manufacture, a one-piece molded warmer tray as defined in claim 24, wherein the thermo-setting plastic is a melamine phenolic plastic so that the heating surface may withstand a relatively mild and uniform heat without hot spots and consequent charring of the thermo-setting plastic material of the warmer tray.

26. As an article of manufacture, a one-piece molded warmer tray as defined in claim 24, including a predetermined ornamental surface formed from a foil-like ornamental lithographed sheet of paper impregnated with a thermo-setting plastic material and fused to the aforesaid heating surface of predetermined shape under heat and pressure whereby the heating surface is decorated with the foil-like ornamental sheet providing an ornamental heating surface.

27. As an article of manufacture, a one-piece molded warmer tray, as defined in claim 24, including a predetermined ornamental surface formed from a foil-like ornamental lithographed sheet of paper impregnated with a thermo-setting plastic material and complementally formed to the upper surface of the tray and handles and fused to the aforesaid heating surface of predetermined shape under heat and pressure whereby the heating surface and handles are decorated with the foil-like ornamental lithographed sheet providing a continuous ornamental heating surface with the upper surface of the integrally molded handles.

28. As an article of manufacture, a one-piece molded tray from a thermo-setting melamine phenolic plastic material, said tray including a tray supporting surface of a predetermined geometrical shape, handles integrally formed at opposite ends with respect to an axis of the tray supporting surface, a peripheral depending base including bottom feet, said tray supporting surface including a predetermined ornamental surface formed from a foil-like ornamental lithographed sheet of paper impregnated with a thermo-setting melamine material and complementally formed to the upper surface of the tray and handles and fused thereto under heat and pressure whereby the tray surface and handles are decorated with the foil-like ornamental lithographed sheet so that the tray surface and handles are ornamented and said tray surface adapted to withstand heated vessels supported thereon.

29. As an article of manufacture, a one-piece molded tray from a thermo-setting melamine phenolic plastic material, said tray including a tray supporting surface of a predetermined geometrical shape, a peripheral depending base providing a recessed space underneath the tray supporting surface, said tray supporting surface including a predetermined ornamental surface formed from a foil-like ornamental lithographed sheet including a thermo-setting melamine material complementally formed to the upper surface of the tray and fused thereto under heat and pressure whereby the tray surface is decorated with the foil-like ornamental lithographed sheet, heating means and insulation therefor mounted within said recess, a detachable bottom plate for enclosing the recess, and handles affixed to said peripheral depending base.

30. As an article of manufacture, a one-piece molded tray from a thermo-setting plastic material, said tray including a peripheral depending base providing a recessed space having an opening in the upper face and an integrally formed bottom plate, a sheet metal heating surface including at least one percelainized surface, and also including heating means in heat transfer relationship to said heating surface for providing uniform heat to the heating surface, means for mounting the heating surface to the base, insulation between said heating means and said bottom plate, and handles affixed to said peripheral depending base.

31. As an article of manufacture, a warming tray, said warming tray including a heating surface, a peripheral depending base providing support for the heating surface and a recess complementally formed to substantially the predetermined shape of the heating surface, a sheet metal heating surface including at least one porcelainized surface and also including electrical heating means adapted to be connected to a source of electrical energy and in heat transfer relationship to said heating surface for providing substantially uniform heat to the heating surface, means for mounting the heating surface to the base, a bottom plate providing a closure for the recess underneath the heating surface, insulation between said heating surface and said bottom plate, and handles affixed to said peripheral depending base for transporting the warming tray for serving.

32. An electrical connector adapted for connecting an electric wire to a resistance element adhering to a porcelainized surface of a heating surface, the connector comprising a metal base for soldering to said resistance element, and a struck-out integral tongue projecting from the outer face of the base for detachably receiving a female connector affixed to said electrical wire, the tongue having a free outer end and an inner end joined to the base, the tongue formed with recess means contiguous to the base to provide clearance for the outer end of the female connector affixed to the outer end of the tongue, and said recessed means being substantially the full-cross section of said free outer end.

References Cited by the Examiner

UNITED STATES PATENTS

| | | | |
|---|---|---|---|
| 1,116,310 | 11/1914 | Maser | 206—72 |
| 1,625,449 | 4/1927 | Bohn et al. | 264—250 |
| 2,149,507 | 3/1939 | Camfield | 156—224 X |
| 2,553,974 | 5/1951 | Lamb | 219—473 |
| 2,603,740 | 7/1952 | Del Buttero | 219—385 |
| 2,644,066 | 6/1953 | Glenn | 338—308 |
| 2,646,380 | 7/1953 | Barlow et al. | 156—244 X |
| 2,915,397 | 12/1959 | Telkes | 219—462 X |
| 2,939,807 | 6/1960 | Needham | 219—345 |
| 2,952,040 | 9/1960 | Phillips | 161—88 |
| 2,976,386 | 3/1961 | Salton | 219—465 |
| 3,043,943 | 7/1962 | Moot | 219—449 |
| 3,057,018 | 10/1962 | Lawrence et al. | 156—224 X |
| 3,108,170 | 10/1963 | Murphy | 338—308 X |
| 3,117,053 | 1/1964 | Lawrence et al. | 156—224 X |

RICHARD M. WOOD, *Primary Examiner.*

MAX L. LEVY, *Examiner.*